United States Patent
Barton et al.

(10) Patent No.: US 10,628,750 B2
(45) Date of Patent: Apr. 21, 2020

(54) SYSTEMS AND METHODS FOR IMPROVING PETROLEUM FUELS PRODUCTION

(71) Applicant: Massachusetts Institute of Technology, Cambridge, MA (US)

(72) Inventors: Paul Inigo Barton, Cambridge, MA (US); Yu Yang, Dorchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1022 days.

(21) Appl. No.: 14/944,167

(22) Filed: Nov. 17, 2015

(65) Prior Publication Data

US 2016/0140448 A1    May 19, 2016

Related U.S. Application Data

(60) Provisional application No. 62/080,852, filed on Nov. 17, 2014.

(51) Int. Cl.
*G06N 7/00* (2006.01)
*G06Q 50/02* (2012.01)
(Continued)

(52) U.S. Cl.
CPC .............. *G06N 7/005* (2013.01); *C10G 99/00* (2013.01); *G06Q 10/04* (2013.01); *G06Q 10/063* (2013.01); *G06Q 50/02* (2013.01); *C10G 2300/10* (2013.01)

(58) Field of Classification Search
CPC ........ G06N 7/005; G06Q 10/06; G06Q 50/02; G06Q 10/04; G06Q 10/063; C10G 99/00; C10G 2300/10

(Continued)

(56) References Cited

U.S. PATENT DOCUMENTS

| 7,698,065 B2* | 4/2010 | Moos | G01V 1/30 702/11 |
| 7,966,331 B2* | 6/2011 | Gardner | G06Q 40/08 707/738 |
| 2007/0215613 A1 | 9/2007 | Kinzer | |

FOREIGN PATENT DOCUMENTS

| WO | WO 97/01096 A1 | 1/1997 |
| WO | WO 2013/181078 A1 | 12/2013 |

OTHER PUBLICATIONS

Kumar et al. "Improve feedstock selection for your refinery". Jun. 2012. HydrocarbonProcssing.com. p. 65-71.*

(Continued)

*Primary Examiner* — Eunhee Kim
(74) *Attorney, Agent, or Firm* — Wolf, Greenfield & Sacks, P.C.

(57) ABSTRACT

A method for selecting one or more crude oils from a plurality of crude oils. In some embodiments, a plurality of scenarios may be generated, each scenario comprising a plurality of values corresponding, respectively, to a plurality of uncertain parameters, the plurality of uncertain parameters comprising at least one uncertain parameter relating to a quality of a crude oil of the plurality of crude oils. In some embodiments, a stochastic programming model may be solved to obtain a solution that optimizes an objective function, and one or more crude oils may be procured based on respective procurement amounts in the solution of the stochastic programming model. In some embodiments, a chance-constrained programming model may be solved to obtain a solution that optimizes an objective function, and a plurality of feedstocks may be blended into a final product based on the solution of the chance-constrained programming model.

8 Claims, 17 Drawing Sheets

(51) Int. Cl.
*C10G 99/00* (2006.01)
*G06Q 10/04* (2012.01)
*G06Q 10/06* (2012.01)

(58) Field of Classification Search
USPC .......................................... 703/10, 2; 702/6
See application file for complete search history.

(56) References Cited

OTHER PUBLICATIONS

Li et al. "Nonconvex Generalized Benders Decomposition for Stochastic Separable Mixed-Integer Nonlinear Programs". J Optim Theory Appl (2011) 151:425-454.*
Joly et al. "Planning and Scheduling for Petroleum Refineries Using Mathematical Programming". Brazilian Journal Chemical. vol. 19, No. 02, pp. 207-228, Apr.-Jun. 2002.*
Li et al., "Scheduling of Crude Oil Operations Under Demand Uncertainty: A Robust Optimization Framework Coupled with Global Optimization". Published online Oct. 28, 2011 in Wiley Online Library (wileyonlinelibrary.com). p. 2373-2396.*
PCT/US2015/061161, Jan. 26, 2016, Invitation to Pay Additional Fees.
PCT/US2015/061161, Apr. 5, 2016, International Search Report and Written Opinion.
PCT/US2015/061161, Jun. 1, 2017, International Preliminary Report on Patentability.
Invitation to Pay Additional Fees dated Jan. 26, 2016 in connection with International Application No. PCT/US2015/061161.
International Search Report and Written Opinion dated Apr. 5, 2016 in connection with International Application No. PCT/US2015/061161.
International Preliminary Report on Patentability dated Jun. 1, 2017 in connection with International Application No. PCT/US2015/061161.
Balas et al., Canonical Cuts on the Unit Hypercube. SIAM Journal of Applied Mathematics. 1972;23(1):61-72.
Benders, Partitioning procedures for solving mixed-variables programming problems. Numerische Mathematik.1962;4:238-252.
Ben-Tal et al., Robust Optimization. Princeton University Press, Princeton, New Jersey. 2009.
Bertsimas et al., The Price of Robustness. Operations Research. 2004;52(1):35-53.
Birge et al., Introduction to Stochastic Programming. Springer, New York, 1997, 12 pages.
Blimes, A Gentle Tutorial of the EM Algorithm and its Application to Parameter Estimation for Gaussian Mixture and Hidden Markov Models. Technical report, University of California-Berkeley International Computer Science Institute. 1997.
Brossard, Chevron Lummus Global RDS/VRDS Hydrotreating-Transportation Fuels from the Bottom of the Barrel. Handbook of Petroleum Refining Processes. 2003; pp. 8.3-8.24.
Calafiore et al., The Scenario Approach to Robust Control Design. IEEE Transactions on Automatic Control. May 2006; 51(5): 742-753.
Carøe et al. Dual decomposition in stochastic integer programming. Operations Research Letters. 1999; 24:37-45.

Chen et al., Decomposition Strategy for the Global Optimization of Flexible Energy Polygeneration Systems. AIChE Journal, 2012;58(10):3080-3095.
Favennec, Refinery operation and management, Editions TECHNIP, Paris, 2001.
Geoffrion, Generalized Benders Decomposition. Journal of Optimization Theory and Applications. 1972;10(4):237-260.
Hartmann, Crude valuation for crude selection. PTQ Magazine, Crambeth Allen Publishing Ltd, GB, No. Q1, Jan. 1, 2003. pp. 123-127.
Horst et al., Global Optimization : Deterministic Approaches. Springer, New York, 3rd edition, 1996; 735 pages.
Jia et al., Mixed-Integer Linear Programming Model for Gasoline Blending and Distribution Scheduling. Industrial & Engineering Chemistry Research. 2003;42:825-835.
Kumar et al., Improve feedstock selection for your refinery. Hydrocarbon Processing. Jan. 6, 2012; p. 65-71.
Leiras et al., Strategic Planning of Integrated Multirefinery Networks: A Robust Optimization Approach Based on the Degree of Conservatism. Industrial & Engineering Chemistry Research. 2010;49:9970-9977.
Li et al., Continuous-Time Modeling and Global Optimization Approach for Scheduling of Crude Oil Operations. AIChE Journal. 2012;58(1):205-226.
Li et al., Decomposition strategy for the stochastic pooling problem. Journal of Global Optimization. 2012;54:765-790.
Li et al., Improving the Robustness and Efficiency of Crude Scheduling Algorithms. AIChE Journal. 2007;53(10):2659-2680.
Maples, Petroleum refinery process economics. PennWell Corporation, 2000.
McCormick, Computability of Global Solutions to Factorable Nonconvex Programs: Part I Convex Underestimating Problems. Mathematical Programming. 1976;10:147-175.
Pawde et al., Crude oil selection: optimisation by weight or by volume? PTQ Magazine, Crambeth Allen Publishing Ltd, GB, No. Q2, Jan. 1, 2010, pp. 67-73.
Pr'Ekopa. Stochastic programming. Kluwer Academic Publishers, Netherlands, 1995.
Reddy et al., A new continuous-time formulation for scheduling crude oil operations. Chemical Engineering Science. 2004;59:1325-1341.
Ribas et al., Operational planning of oil refineries under uncertainty Special issue: Applied Stochastic Optimization. IMA Journal of Management Mathematics. 2012; 23:397-412.
Shah et al., Short-Term Scheduling of a Large-Scale Oil-Refinery Operations: Incorporating Logistics Details. AIChE Journal. 2011;57(6):1570-1584.
Swafford et al., Improving crude oil selection. PTQ Magazine, Crambeth Allen Publishing Ltd, GB, No. Q3. Jan. 1, 2008; pp. 125-129.
Tawarmalani et al., Convexification and global optimization in continuous and mixed-integer nonlinear programming: theory, algorithms, software, and applications, nonconvex optimization and its applications. The Netherlands: Kluwer Academic Publishers, 2002.
Van Slyke et al., L-Shaped Linear Programs With Applications to Optimal Control and Stochastic Programming. SIAM Journal of Applied Mathematics. 1969;17(4):638-663.

\* cited by examiner (Deterministic)

(Offset)

(Stochastic)

(Deterministic)

(Stochastic)**

SYSTEMS AND METHODS FOR IMPROVING PETROLEUM FUELS PRODUCTION

RELATED APPLICATION

This application claims priority under 35 U.S.C. § 119(e) to U.S. Provisional Application Ser. No. 62/080,852, entitled "OPTIMIZATION TECHNIQUES IN THE PRESENCE OF UNCERTAINTIES" filed on Nov. 17, 2014, which is herein incorporated by reference in its entirety.

BACKGROUND

Some petroleum refineries procure crude oils and process a mixture of crude oils into several intermediate products. These intermediates are blended together to create final products such as liquid petroleum gas (LPG), gasoline, diesel, jet fuel, asphalt, petroleum coke, etc. Stringent quality requirements may be imposed on some of these final products, for example, by environmental agencies, customers, etc.

SUMMARY

Aspects of the present disclosure relate to systems and methods for improving petroleum fuels production. In some embodiments, a method for selecting one or more crude oils from a plurality of crude oils may be provided, the method comprising acts of: generating a plurality of scenarios, each scenario comprising a plurality of values corresponding, respectively, to a plurality of uncertain parameters, the plurality of uncertain parameters comprising at least one uncertain parameter relating to a quality of a crude oil of the plurality of crude oils; using at least one processor programmed by executable instructions to solve a stochastic programming model to obtain a solution that optimizes an objective function, wherein: the stochastic programming model represents one or more refinery operations performed on one or more crude oils to produce one or more final products; the solution includes one or more crude oils to be procured and, for each crude oil to be procured, a procurement amount; and the solution satisfies at least one constraint in each scenario of the plurality of scenarios, the constraint representing a quality specification for a final product; and procuring the one or more crude oils based on respective procurement amounts in the solution of the stochastic programming model.

In some embodiments, system for selecting one or more crude oils from a plurality of crude oils may be provided, the system comprising: at least one processor; and at least one computer-readable medium having encoded thereon executable instructions, wherein the at least one processor is programmed by the executable instructions to: generate a plurality of scenarios, each scenario comprising a plurality of values corresponding, respectively, to a plurality of uncertain parameters, the plurality of uncertain parameters comprising at least one uncertain parameter relating to a quality of a crude oil of the plurality of crude oils; solve a stochastic programming model to obtain a solution that optimizes an objective function, wherein: the stochastic programming model represents one or more refinery operations performed on one or more crude oils to produce one or more final products; the solution includes one or more crude oils to be procured and, for each crude oil to be procured, a procurement amount; and the solution satisfies at least one constraint in each scenario of the plurality of scenarios, the constraint representing a quality specification for a final product; and cause the one or more crude oils to be procured based on respective procurement amounts in the solution of the stochastic programming model.

In some embodiments, at least one computer-readable medium having encoded thereon executable instructions that, when executed by at least one processor, cause the at least one processor to perform a method for selecting one or more crude oils from a plurality of crude oils, the method comprising acts of: generating a plurality of scenarios, each scenario comprising a plurality of values corresponding, respectively, to a plurality of uncertain parameters, the plurality of uncertain parameters comprising at least one uncertain parameter relating to a quality of a crude oil of the plurality of crude oils; using at least one processor programmed by executable instructions to solve a stochastic programming model to obtain a solution that optimizes an objective function, wherein: the stochastic programming model represents one or more refinery operations performed on one or more crude oils to produce one or more final products; the solution includes one or more crude oils to be procured and, for each crude oil to be procured, a procurement amount; and the solution satisfies at least one constraint in each scenario of the plurality of scenarios, the constraint representing a quality specification for a final product; and causing the one or more crude oils to be procured based on respective procurement amounts in the solution of the stochastic programming model.

In some embodiments, a method may be provided, comprising acts of: identifying, for each uncertain parameter of a plurality of uncertain parameters, a probability distribution for the uncertain parameter, wherein a first uncertain parameter of the plurality of uncertain parameters relates to a quality of a first feedstock; using at least one processor programmed by executable instructions to solve a chance-constrained programming model to obtain a solution that optimizes an objective function, wherein: the chance-constrained programming model represents a blending operation that blends a plurality of feedstocks into a final product, the plurality of feedstocks comprising the first feedstock; the chance-constrained programming model is solved based on the probability distributions for the plurality of uncertain parameters; the solution includes one or more feedstocks to be blended and, for each feedstock to be blended, a percentage of the feedstock in the final product; the solution satisfies at least one constraint with at least a selected probability, the constraint representing a quality specification for a final product; and blending the one or more feedstocks based on respective percentages in the solution of the chance-constrained programming model.

In some embodiments, a system may be provided, comprising: at least one processor; and at least one computer-readable medium having encoded thereon executable instructions, wherein the at least one processor is programmed by the executable instructions to: identify, for each uncertain parameter of a plurality of uncertain parameters, a probability distribution for the uncertain parameter, wherein a first uncertain parameter of the plurality of uncertain parameters relates to a quality of a first feedstock; use at least one processor programmed by executable instructions to solve a chance-constrained programming model to obtain a solution that optimizes an objective function, wherein: the chance-constrained programming model represents a blending operation that blends a plurality of feedstocks into a final product, the plurality of feedstocks comprising the first feedstock; the chance-constrained programming model is solved based on the probability distributions for the plurality of uncertain parameters; the solution includes one or more feedstocks to be blended and, for each feedstock to be blended, a percentage of the feedstock in the final product; the solution satisfies at least one constraint with at least a selected probability, the constraint representing a quality specification for a final product; and cause the one or more feedstocks to be blended based on respective percentages in the solution of the chance-constrained programming model.

In some embodiments, at least one computer-readable medium having encoded thereon executable instructions that, when executed by at least one processor, cause the at least one processor to perform a method comprising acts of: identifying, for each uncertain parameter of a plurality of uncertain parameters, a probability distribution for the uncertain parameter, wherein a first uncertain parameter of the plurality of uncertain parameters relates to a quality of a first feedstock; using at least one processor programmed by executable instructions to solve a chance-constrained programming model to obtain a solution that optimizes an objective function, wherein: the chance-constrained programming model represents a blending operation that blends a plurality of feedstocks into a final product, the plurality of feedstocks comprising the first feedstock; the chance-constrained programming model is solved based on the probability distributions for the plurality of uncertain parameters; the solution includes one or more feedstocks to be blended and, for each feedstock to be blended, a percentage of the feedstock in the final product; the solution satisfies at least one constraint with at least a selected probability, the constraint representing a quality specification for a final product; and causing the one or more feedstocks to be blended based on respective percentages in the solution of the chance-constrained programming model.

BRIEF DESCRIPTION OF DRAWINGS

Various embodiments will be described with reference to the following figures.

DETAILED DESCRIPTION OF INVENTION

Figure 1:
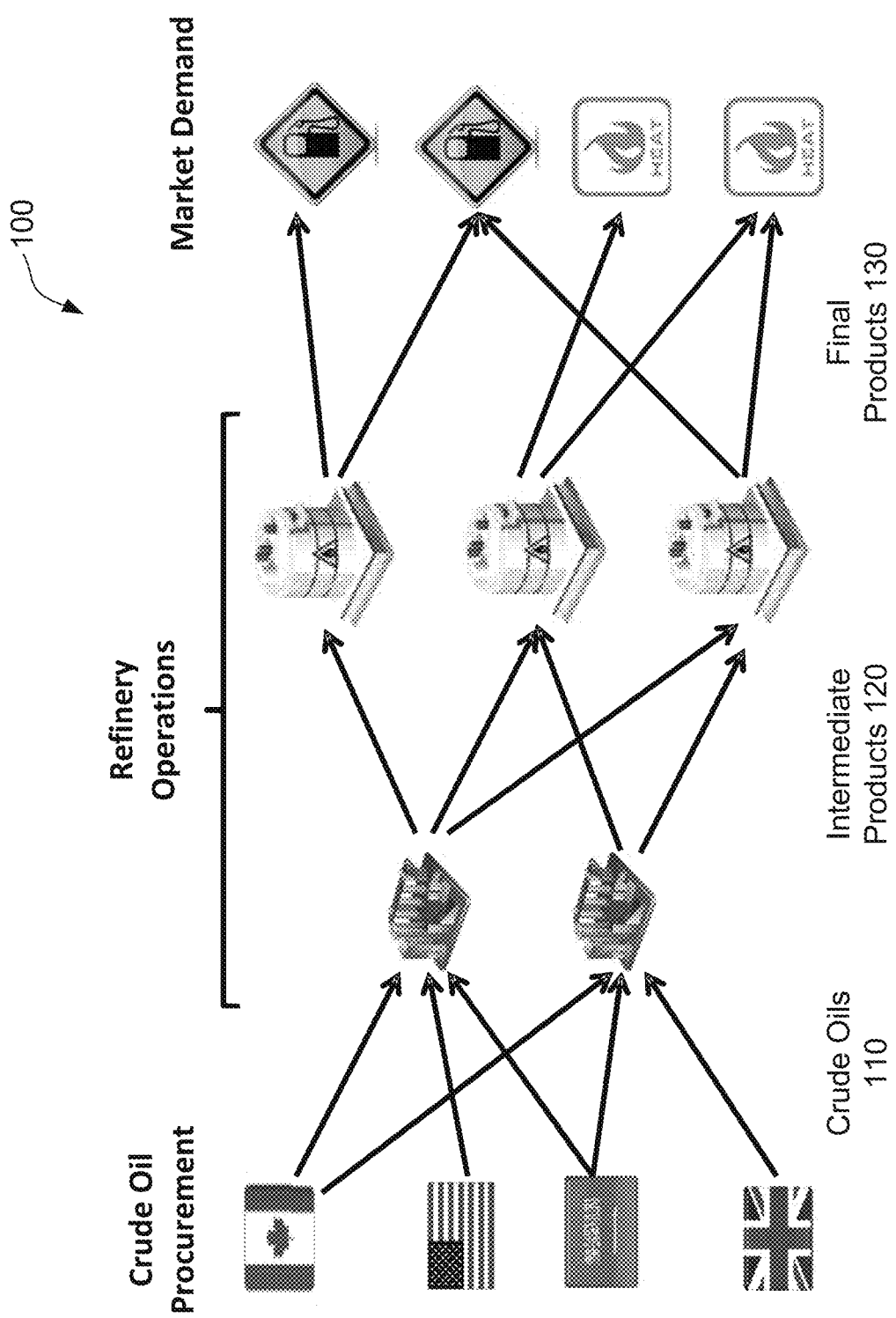
FIG. 1 shows, schematically, an illustrative oil refinery system 100, in accordance with some embodiments.

Aspects of the present disclosure relate to systems and methods for improving petroleum fuels production. In some embodiments, techniques are provided for choosing one or more crude oils to be procured, and/or for determining how one or more procured crude oils are to be processed. In some embodiments, techniques are provided for determining how one or more intermediate products are to be blended to produce a final product. Such techniques may improve product quality, for example, by reducing a likelihood that a final product will fail to meet one or more specifications.

In some refinery operations, different blends of intermediates may be chosen, depending on available quantities and/or qualities of the intermediates, to produce a final product such as gasoline. The available quantities and/or qualities of the intermediates may in turn depend on available quantities and/or qualities of crudes, and/or variations in refinery operations. Thus, uncertainties in available crude quantities and/or qualities, and/or uncertainties in refinery operations, may give rise to uncertainties in final product quality. Because of these uncertainties, a final product may sometimes be produced that fails to meet one or more specifications. Such an off-spec product may simply be burned, or may go through mitigation processing. In both cases, there may be waste of resources, negative environmental impact, safety issues, legal penalties, delay in product delivery, and/or increased costs.

Accordingly, in some embodiments, techniques are provided for modeling uncertainties and quantifying likelihoods of various outcomes, so that decisions may be made to more effectively avoid production of off-spec products and the associated undesirable. For instance, in some embodiments, techniques are provided for explicitly representing uncertain parameters in one or more stochastic models for making procurement and/or operational decisions.

Examples of parameters that may be represented in a decision making model include, but are not limited to, available quantities and qualities of crudes and intermediates, operating conditions, process availabilities, timing of logistical events, costs of feedstocks, product prices, market demands, etc. Any such parameter may have a true value that may fall within a range of an expected value. However, it may be unlikely that the true value will be precisely the same as the expected value, or even a measured value. As a result, decisions made deterministically based on expected, measured, and/or other nominal parameter values may turn out to be suboptimal, and may, in some cases, result in off-spec products.

By contrast, in some embodiments, a stochastic model with one or more uncertain parameters may be used to facilitate decision making, where each uncertain parameter (e.g., market demand, product price, crude oil property, etc.) may be represented by a known probability distribution over a set of possible values (e.g., a Gaussian distribution over a numerical range with known mean and standard deviation). Any suitable probability distribution or combination of probability distributions may be used to represent the one or more uncertain parameters, as aspects of the present disclosure are not so limited.

In some embodiments, a two-stage stochastic programming formulation may be used, where the first stage may include selecting one or more crude oils to be procured, and the second stage may include determining how one or more refinery operations are to be performed (e.g., determining flow rates, cut point temperatures, etc.). At the second stage, one or more uncertain parameters have been realized in a particular scenario (e.g., particular quantities and qualities of crude oils procured). The two-stage stochastic programming formulation may be solved to optimize an expectation of some function (e.g., to reduce waste, costs, etc.), while ensuring that one or more constraints are met (e.g., one or more quality thresholds defined in one or more product specifications).

In some embodiments, a chance-constrained programming model may be used to determine how a number of feedstocks available at a blending terminal are to be combined to produce a final product. Uncertainties in qualities of the feedstocks may be represented explicitly using probability distributions, and the chance-constrained programming model may be solved to optimize an expectation of some function (e.g., to reduce waste, costs, etc.), while ensuring that one or more constraints are met (e.g., one or more quality thresholds defined in one or more product specifications).

Some refinery operations deal with uncertainties by setting quality targets that are higher than required by a product specification (e.g., government regulation, customer contract, etc.). This is sometimes done by raising quality thresholds defined in a specification by some offset factor (e.g., 10%). The inventors have recognized and appreciated that, due to the artificially raised quality thresholds, decisions may be made to procure higher quality crudes and/or perform more costly processing, which may result in products that exceed specifications unnecessarily. Therefore, such an approach may be wasteful and/or costly in the long run.

For example, there may be a particular level of market demand at a particular price for a product that meets one or more particular quality thresholds. While procurement and/or operational decisions based on artificially raised quality thresholds (e.g., 10% higher than the one or more particular quality thresholds) may avoid production of an off-spec product, such an approach may result in "giveaway" (e.g., a product that is of higher quality but is sold as a lower quality product). For instance, there may be no market demand for the higher quality product, and therefore the resources used to produce the higher quality product (e.g., higher quality crudes, additional refinery processing, etc.) may be wasted.

The inventors have recognized and appreciated that the likelihood of producing a product that meets or exceeds quality thresholds may be greater than the likelihood of producing an off-spec product. Thus, artificially raising quality thresholds may be overly conservative, and may result in a significant amount of waste over the long run.

The inventors have further recognized and appreciated that the techniques described herein may provide more robust solutions for crude oil procurement and/or refinery operations. Over the long run, these solutions may be effective in increasing profit while maintaining product quality. For instance, by representing uncertain parameters as random variables with known probability distributions, and then constructing and solving one or more stochastic models involving the uncertain parameters, both the occurrences of "giveaways" and the occurrences of off-spec products may be reduced over time.

It should be appreciated that the techniques introduced above and discussed in greater detail below may be implemented in any of numerous ways, as the disclosed techniques are not limited to any particular manner of implementation. The examples shown in the figures and described herein are provided solely for illustrative purposes.

FIG. 1 shows, schematically, an illustrative oil refinery system 100, in accordance with some embodiments. In this example, a refinery operator may procure one or more crude oils 110 from one or more sources (e.g., different countries, regions, distributors, etc.). The one or more crude oils 110 may be processed into one or more intermediate products 120, which may in turn be blended to produce one or more final products 130.

Figure 2A:
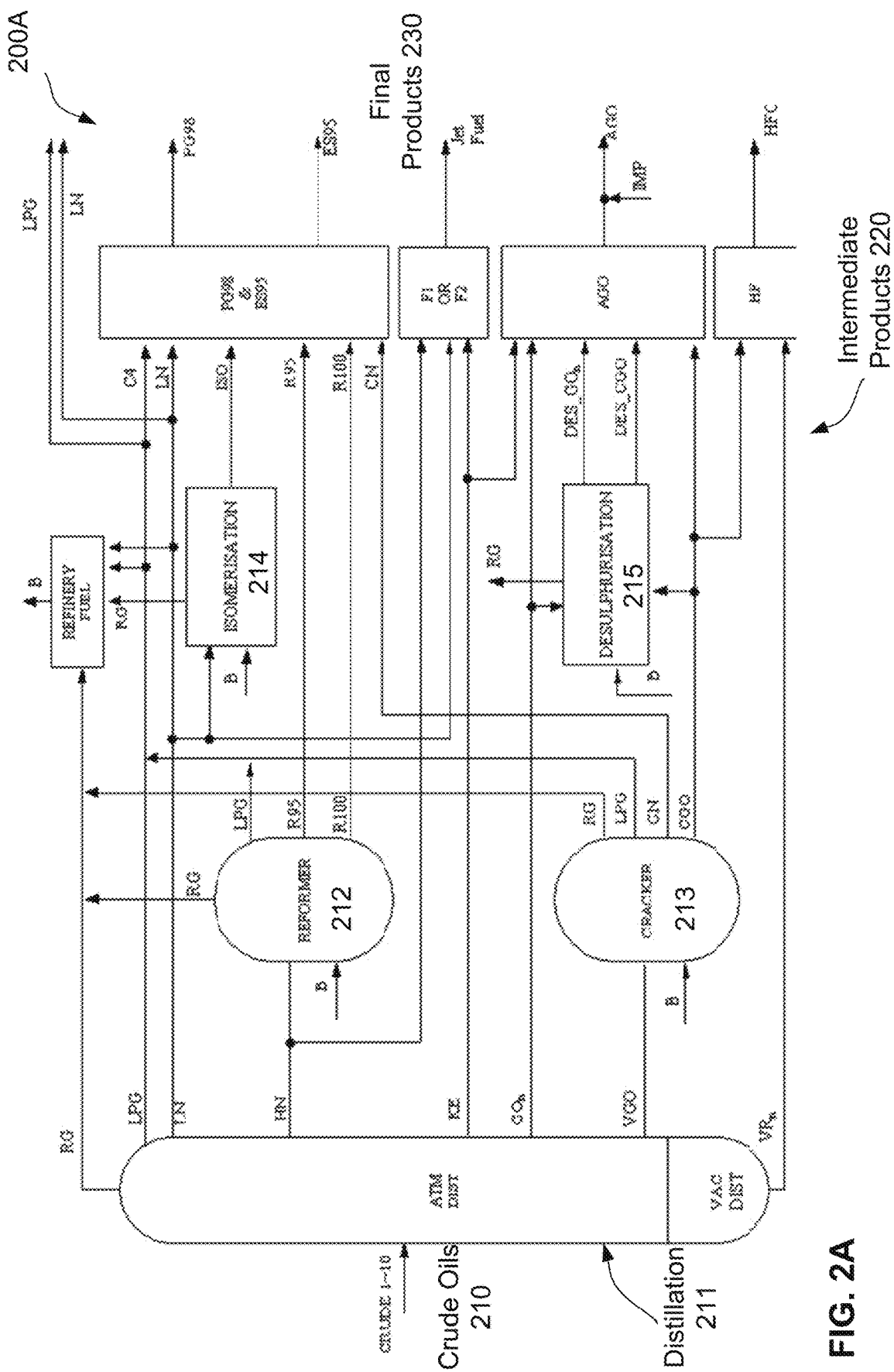
FIG. 2A shows an illustrative oil refinery flow chart 200A, in accordance with some embodiments.

FIG. 2A shows an illustrative oil refinery flow chart 200A, in accordance with some embodiments. For instance, the illustrative flow chart 200A may be a schematic representation of the processing performed by the illustrative oil refinery system 100 shown in the example of FIG. 1.[1]

[1] See, e.g., J. P. Favennec, *Refinery operation and management*, Editions TECHNIP, Paris, 2001.

Figure 10:
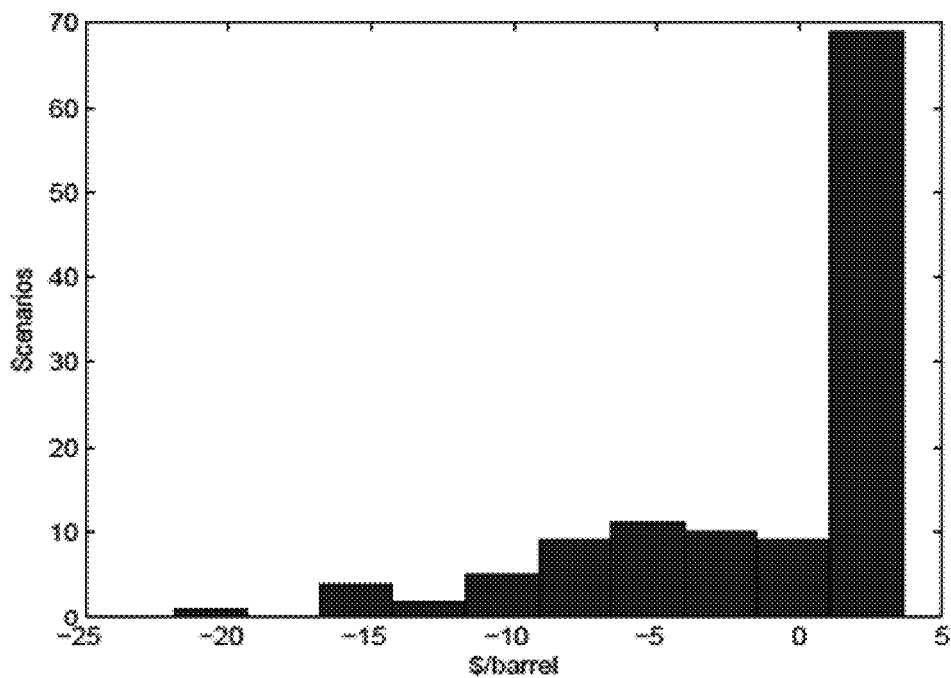
FIGS. 10-12 show, respectively, illustrative profit histograms for the deterministic, offset, and stochastic methods in Example 1.

In the example of FIG. 2A, 10 crude oils are available for procurement. Procured crude oils may be fed through one or more processing stations (e.g., a distillation unit 211, a reformer unit 212, a cracker unit 213, an isomerization unit 214, and a desulphurization unit 215) to produce intermediate products 220. Appropriate combinations of the intermediate products 220 may be blended at different blending terminals (e.g., PG98 & ES95, F1 or F2, AGO, and HF, as shown in FIG. 2A) to produce final products 230 (e.g., gasoline, jet fuel, diesel, and heavy fuel oil, respectively).

It should be appreciated that aspects of the present disclosure are not limited to the use of the illustrative flow design shown in FIG. 2A, as other flow designs with different combinations and/or arrangements of processing stations may also be suitable.

Figure 3:
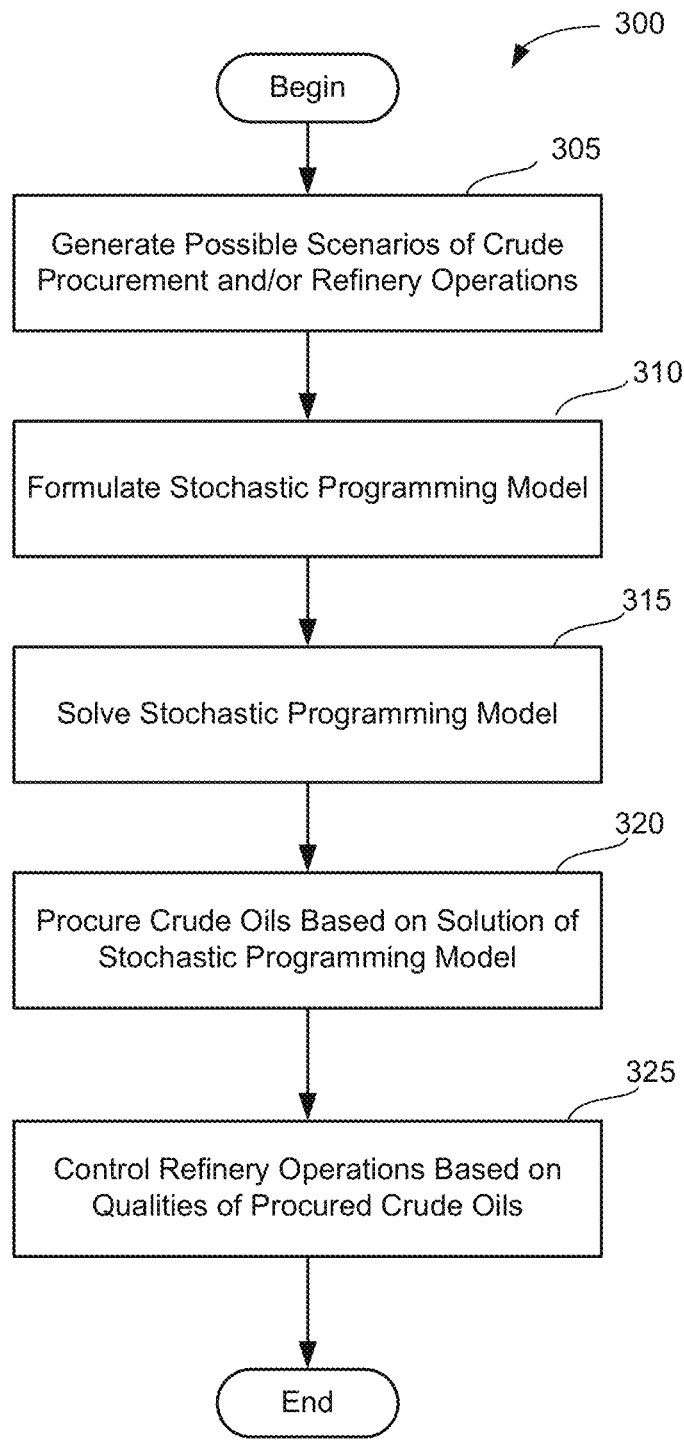
FIG. 3 shows an illustrative process 300 that may be performed by an oil refinery system to choose one or more crude oils to be procured, and/or to determine how to process one or more procured crude oils, in accordance with some embodiments.

FIG. 3 shows an illustrative process 300 that may be performed by an oil refinery system to choose one or more crude oils to be procured, and/or to determine how to process one or more procured crude oils, in accordance with some embodiments. For instance, the process 300 may be performed by the illustrative oil refinery system 100 shown in the example of FIG. 1.

As explained above, uncertainties in available quantities and/or qualities of crude oils, and/or uncertainties in the refinery operations performed on the crude oils, may give rise to uncertainties in the qualities of final products. In some embodiments, techniques are provided for representing crude procurement and/or refinery operations uncertainties in stochastic models, and using the stochastic models to choose crude oils to be procured and/or determine how to process procured crude oils.

At act 305 of the illustrative process 300 shown in FIG. 3, a plurality of possible scenarios of crude procurement and/or refinery operations may be generated, where each scenario may include a vector of values, and each value in the vector may be a possible value for a corresponding uncertain parameter. Examples of uncertain parameters that may be modeled include, but are not limited to, costs and available qualities and quantities of crude oils, market demands and prices for final products, technical parameters such as catalyst activity, etc.

In some embodiments, scenarios may be generated from historical data. For example, one or more crude oils may have previously been procured from a particular source (e.g., distributor, region, country, etc.), and quality data may have been measured and recorded (e.g., sulfur fraction, vacuum residue yield, viscosity, vaper pressure, etc.). Any one or more recorded scenarios may be used as possible scenarios for future procurement from the same source. Alternatively, or additionally, a sampling technique may be used to generate possible scenarios, as described below in connection with FIG. 4.

In some embodiments, an optimal solution may be a solution that maximizes or minimizes the expectation of some function, without violating any constraint. A larger number of scenarios may provide a more accurate representation of underlying uncertainties and therefore may result in a more accurate expected value. However, the inventors have recognized and appreciated that, due to hardware restrictions (e.g., available memory and/or processing cycles), it may take a significant amount of time for a solver to find an optimal solution from a very large number of scenarios. The inventors have recognized and appreciated that a reasonable balance between solution time and accuracy may be achieved with hundreds or even thousands of scenarios, although it should be appreciated that aspects of the present disclosure are not limited to the use of any particular number of scenarios.

Figure 4:
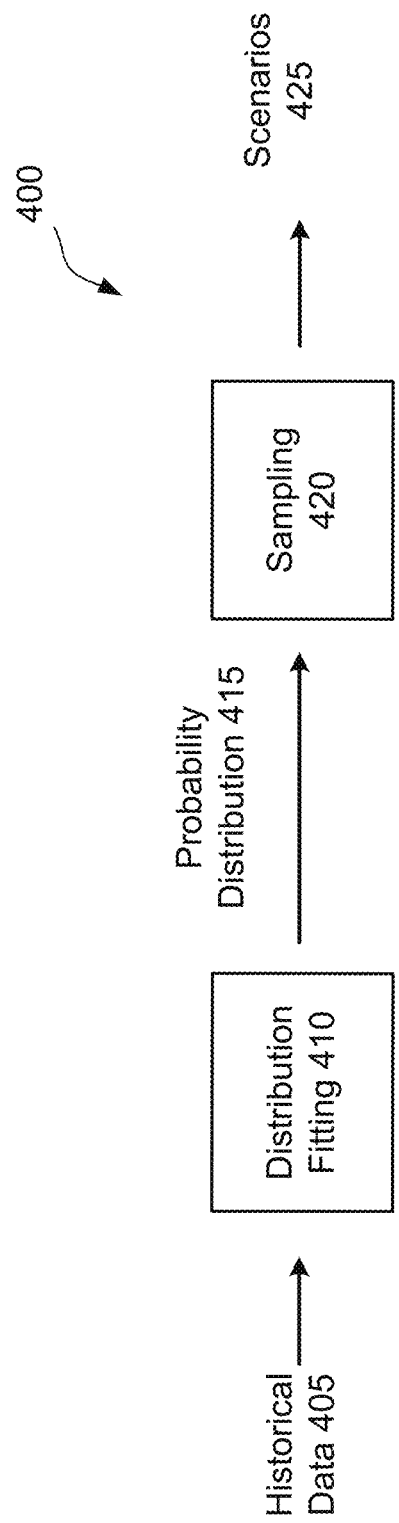
FIG. 4 shows an illustrative system 400 that may be used to generate possible scenarios, in accordance with some embodiments.

FIG. 4 shows an illustrative system 400 that may be used to generate possible scenarios, in accordance with some embodiments. For instance, the system 400 may be used when some historical data 405 is available, but more scenarios are desired.

In the example shown in FIG. 4, the system 400 includes a distribution fitting module 410 and a sampling module 420. In some embodiments, the distribution fitting module 410 may receive as input one or more historical data points for a particular uncertain parameter, where the one or more historical data points may include values previously measured from crude oils from a particular source. The distribution fitting module 410 may then apply one or more distribution fitting techniques, such as maximum-likelihood estimation techniques,[2] to identify a probability distribution that fits the input data.

[2] See, e.g., expectation maximization techniques described in J. Blimes, *A gentle tutorial of the EM algorithm and its application to parameter estimation for Gaussian mixture and hidden Markov models*, Technical Report, University of California-Berkeley International Computer Science Institute, 1997.

Any suitable probability distribution may be used, including, but not limited to, a Gaussian distribution or mixture Gaussian distribution. For example, the distribution fitting module 410 may be programmed to identify, from the input data, a mean and a standard deviation for a Gaussian distribution, or a set of mean and standard deviation combinations for a mixture Gaussian distribution. However, it should be appreciated that aspects of the present disclosure are not limited to the use of a Gaussian distribution or a mixture Gaussian distribution, as other probability distributions may also be suitable.

In some embodiments, the sampling module 420 may receive as input a probability distribution 415, such as a mean and a standard deviation for a Gaussian distribution output by the distribution fitting module 410, and may apply one or more sampling techniques to the input probability distribution to generate one or more scenarios 425. For instance, the sampling module 420 may apply a Monte Carlo sampling method to generate the one or more scenarios 425. However, it should be appreciated that aspects of the present disclosure are not limited to the use of a Monte Carlo sampling method, as other sampling methods may also be suitable.

Returning to FIG. 3, a stochastic programming model may be formulated at act 310 of the illustrative process 300. In some embodiments, the stochastic programming model may be formulated to select one or more crude oils to be procured, including a quantity to be procured for each selected crude oil. Additionally, or alternatively, the stochastic programming model may be formulated to determine one or more aspects of refinery operations to be performed on one or more procured crude oils.

In some embodiments, procurement decisions for individual candidate crude oils may be represented as binary variables in a stochastic programming model. For example, each candidate crude oil may have a corresponding binary variable, where a value of zero may indicate that the candidate crude oil is not selected, and a value of one may indicate that the candidate crude oil is selected. Additionally, or alternatively, procurement quantity for each candidate crude oil may be represented as an integer variable (e.g., a discrete number of lots to be procured).

The inventors have recognized and appreciated that representing procurement quantities as integers may advantageously allow a solver to output n-best overall procurement decisions (e.g., n-best combinations of crude oils, including respective quantities to be procured). Furthermore, representing procurement quantities as integers may advantageously allow exclusion of certain candidates by adding constraints into the stochastic programming model (e.g., using Balas cuts as described below), which may reduce solver time. However, it should be appreciated that aspects of the present disclosure are not limited to the representation of procurement quantities as integers, as in some embodiments one or more procurement quantities may be represented using continuous variables.

In some embodiments, a stochastic programming model may include one or more objective functions. Examples of objective functions include, but are not limited to, expected crude procurement costs, expected operational costs, expected importation costs, and/or expected revenues from sales of final products. Additionally, or alternatively, non-monetary costs and/or benefits may be modeled, such as environmental impact, legal penalty, etc.

In some embodiments, a stochastic programming model may be solved to maximize expected profit over different choices of crude oil combinations. For instance, expected profit may be the expectation of the difference between benefits and costs, where any of the benefits and costs may be monetary and/or non-monetary. The expectation may be calculated as the sum of the differences over all scenarios, weighted respectively by probabilities of the scenarios. However, it should be appreciated that the techniques described herein may be used to optimize any desired function, in addition to, or instead of, expected profit.

In some embodiments, a stochastic programming model may include one or more constraints. Examples of constraints include, but are not limited to, crude oil procurement limitations, material balances, energy balances, unit capacities, market demands, and/or quality specifications.

In some embodiments, a two-stage stochastic programming model may be formulated. At Stage I, a crude oil combination may be selected, including respective quantities to be procured. At Stage II, based on realizations of uncertain parameters in a particular scenario, refinery operations may be determined to maximize expected profit while meeting all constraints.

In some embodiments, refinery operations may be represented by one or more functions, such as bilinear functions for modeling pooling processes, trilinear and/or signomial functions for modeling crude distillation unit (CDU) operations, etc. Although specific examples of such functions are provided below, it should be appreciated that aspects of the present disclosure are not limited to the use of any particular functions or forms of functions to represent refinery operations.

For purposes of illustration, detailed examples of stochastic programming models are provided below. It should be appreciated that aspects of the present disclosure may be implemented in any suitable manner and are not limited to the details described in connection with this example.

Mass Balance

In some embodiments, an optimal operation of a refinery may be determined at Stage II according known properties of selected crudes. In this example, material balance equations are developed for all effluents of a crude distillation unit (CDU), R95, R100, isomerate (ISO), catalytic cracked gasoline (CN), light cycle oil (CGO), desulfurized gas oil (DESGO), desulfurized light cycle oil (DESCGO), and refinery fuel (RF).[3] However, it should be appreciated that aspects of the present disclosure are not limited to the specific examples provided herein, as other material balance equations with the same or different parameters may also be used.

[3] See, e.g., J. P. Favennec, *Refinery operation and management*, Editions TECHNIP, Paris, 2001.

In some embodiments, a refinery may include crude distillation, reformer, cracker, isomerization, and desulfurization units, denoted by D, R, Cr, I and Des, respectively. In a pooling process, there may be five blending tanks, denoted by ES95, PG98, JF, DIESEL and HF, according to respective products. An illustrative flow chart 200A is shown in FIG. 2A and described above.

In some embodiments, a cracker unit may be operated at different severities, denoted by Mogas and AGO, to maximize CN or CGO, respectively. Additionally, or alternatively, a reformer may be operated at different severities: 95 severity and 100 severity, denoted by Sev95 and Sev100, respectively.

Throughout this disclosure, triple subscripts may be used to differentiate distinct variables and parameters. A first subscript may indicate a processing unit involved (e.g., D, R, Cr, I or Des). A second subscript may indicate an input or output of the relevant processing unit. A third subscript may denote an operating mode of the relevant processing unit (e.g., Sev00 or Sev95 for a reformer, or Mogas or AGO for a cracker), or one or more processing materials (e.g., $C_1$-$C_{10}$, CGO, $GO_i$, etc.). For example, $x_{R,HN,Sev95}$ may denote an HN inflow to a reformer running in Sev95 severity, and $P_{D,RG,C_i}$ may denote an RG yield of crude $C_i$ from a CDU.

Refinery Gas (RG): In some embodiments, RG may be burned as refinery fuel without any quantity constraints. A balance equation for RG may be given by the following:

$$\Sigma_i z_{D,C_i} P_{D,RG,C_i} + x_{R,HN,Sev95} P_{R,RG,Sev95} + x_{R,HN,Sev100} P_{R,RG,Sev100} +$$
$$x_{Cr,VGO,Mogas} P_{Cr,RG,Mogas} + x_{Cr,VGO,AGO} P_{Cr,RG,AGO} +$$
$$\Sigma_i z_{D,C_i} P_{D,LN,C_i} P_{I,RG} + \Sigma_i z_{C_i} Q P_{C_i} P_{D,GO_i,C_i} P_{Des,RG,GO_i} +$$
$$x_{Des,CGO} P_{Des,RG,CGO} + x_{RF,LG} + x_{RF,LN} = x_{RF,RG},$$

where P represents a yield (e.g., percentage of feedstock supplied) for a processing unit in the refinery, and $z_{D,C_i}$ represents a quantity of procured crude oil $C_i$ with unit kT. In some embodiments, $P_D$ may be found from crude oil assay, whereas other yields, such as $P_{Cr}$, $P_R$, $P_{jet}$, $P_I$, $P_{Des}$, may be known in the art of oil refinery.[4]

[4] Id.

Liquefied Petroleum Gas (LG): In some embodiments, LG may be produced by a CDU, reformer, and cracker. LG may be used as refinery fuel or a feedstock for gasoline, or traded in the market. A balance equation for LG may be given by the following:

$$x_{R,HN,Sev95} P_{R,LG,Sev95} + x_{R,HN,Sev100} P_{R,LG,Sev100} +$$
$$x_{Cr,VGO,Mogas} P_{Cr,LG,Mogas} + x_{Cr,VGO,AGO} P_{Cr,LG,AGO} +$$
$$\Sigma_i z_{D,C_i} P_{D,LG,C_i} = x_{PG98,LG} + x_{ES95,LG} + x_{RF,LG} +$$
$$x_{Pro,LG},$$

where Pro represents product sold to the market and RF represents a refinery fuel tank.

Light Naphtha (LN): In some embodiments, LN may be separated from crude oil in a CDU to further produce ES95, PG98, JF, or refinery fuel. A balance equation for LN may be given by the following:

$$\Sigma_i z_{D,C_i} P_{D,LN,C_i} = x_{I,LN} + x_{JF,JF,F1} P_{JF,LN,F1} +$$
$$x_{JF,JF,F2} P_{JF,LN,F2} + x_{PG98,LN} + x_{ES95,LN} + x_{RF,LN} +$$
$$x_{Pro,LN},$$

where F1 and F2 are two formulations of JF.[5]

[5] Id.

Heavy Naphtha (HN): In some embodiments, HN may be used for producing jet fuel or as input to a reformer. A balance equation for HN may be given by the following:

$$\Sigma_i z_{D,C_i} P_{D,HN,C_i} = x_{JF,JF,F1} P_{JF,HN,F1} +$$
$$x_{JF,JF,F2} P_{JF,HN,F2} + x_{R,HN,Sev95} + x_{R,HN,Sev100}.$$

Kerosene (KE): In some embodiments, KE may be split into two sub-flows, one for producing jet fuel and the other for producing diesel. A balance equation for KE may be given by the following:

$$\Sigma_i z_{D,C_i} P_{D,KE,C_i} = x_{JF,JF,F1} P_{JF,KE,F1} +$$
$$x_{JF,JF,F2} P_{JF,KE,F2} + x_{DIESEL,KE}.$$

Gas Oil (GO): In some embodiments, GO may be a feedstock for producing diesel, and may flow into a blending tank directly, or may be pre-processed by desulfurization equipment. Since sulfur fraction may vary from crude to crude, $GO_i$ may be used to construct material balance of a gas oil component for each crude independently. A balance equation for $GO_i$ may be given by the following:

$$z_{D,C_i} P_{D,GO_i,C_i} = x_{DIESEL,GO_i} + x_{Des,GO_i}, i \in \{1,2,\ldots,10\}.$$

Vacuum Distillate (VGO): In some embodiments, VGO separated from crude oil may flow into a cracker to yield small chain and more valuable molecules. A balance equation for VGO may be given by the following:

$$\Sigma_i z_{D,C_i} P_{D,VGO,C_i} = x_{Cr,VGO,Mogas} + x_{Cr,VGO,AGO}.$$

Vacuum Residual (VR): In some embodiments, VR may directly flow to an HF tank to produce heavy fuel oil, however, each $VR_i$ may be modeled individually due to differences in viscosities. A balance equation for $VR_i$ may be given by the following:

$$z_{D,C_i} P_{D,VR_i,C_i} = x_{HF,VR_i}, i \in \{1,2,\ldots,10\}.$$

R95: In some embodiments, R95 may be an outflow of a reformer, and may be used to produce gasoline. A balance equation for R95 may be given by the following:

$$x_{R,HN,Sev95} P_{R,R95,Sev95} + x_{R,HN,Sev100} P_{R,R95,Sev100} = x_{PG98,R95} x_{ES95,R95}.$$

R100: In some embodiments, R100 may be an outflow of a reformer, and may be used to produce gasoline. A balance equation for R100 may be given by the following:

$$x_{R,HN,Sev95} P_{R,R100,Sev95} + x_{R,HN,Sev100} P_{R,R100,Sev100} = x_{PG98,R100} + x_{ES95,R100}.$$

Isomerate (ISO): In some embodiments, ISO may be an output of isomerization processing, and may be used to produce PG98 and ES95. A balance equation for ISO may be given by the following:

$$x_{I,LN} P_{I,ISO} = x_{PG98,ISO} + x_{ES95,ISO}.$$

Catalytic Cracked Gasoline (CN): In some embodiments, CN may be produced by a cracker and fed into a gasoline tank for PG98 and ES95. A balance equation for CN may be given by the following:

$$x_{Cr,VGO,Mogas} P_{Cr,CN,Mogas} + x_{Cr,VGO,AGO} P_{Cr,CN,AGO} = x_{PG98,CN} + x_{ES95,CN}.$$

Light Cycle Oil (CGO): In some embodiments, CGO may be produced by a cracker and used to further yield diesel and HF. A balance equation for CGO may be given by the following:

$$x_{Cr,VGO,Mogas} P_{Cr,CGO,Mogas} + x_{Cr,VGO,AGO} P_{Cr,CGO,AGO} = x_{DIESEL,CGO} + x_{Des,CGO} + x_{HF,CGO}.$$

Desulfurized Gas Oil (DESGO): In some embodiments, $DESGO_i$ may be a raffinate of gas oil $GO_i$ in a desulfurization process, and may be fed into a diesel tank. A balance equation for DESGO may be given by the following:

$$x_{Des,GO_i} P_{Des,DESGO_i} = x_{DIESEL,DESGO_i}, i \in \{1,2,\ldots,10\}.$$

Desulfurized Light Cycle Oil (DESCGO): In some embodiments, DESCGO may be a raffinate of CGO in a desulfurization process, and may be fed into a diesel tank. A balance equation for DESCGO may be given by the following:

$$x_{Des,CGO} P_{Des,DESCGO} = x_{DIESEL,DESCGO}.$$

Refinery Fuel (RF): In some embodiments, fuel for a refinery may be provided by products such as RG, LG and LN. Consumption of RF at each processing unit may be proportional to input of the unit. Total consumption may be adjusted by a constant value of 15.2 KT, representing fuel needed for maintaining processes. A balance equation for RF may be given by the following:

$$x_{RF,RG} U_{RG} + x_{RF,LG} U_{LG} + x_{RF,LN} U_{LN} = \Sigma_i z_{D,C_i} W_{C_i} + x_{Cr,VGO,Mogas} W_{Cr,Mogas} + x_{Cr,VGO,AGO} W_{Cr,AGO} + x_{R,HN,Sev95} W_{R,Sev95} + x_{R,HN,Sev100} W_{R,Sev100} + x_{ISO,LN} W_{ISO} + \Sigma_i x_{Des,GO_i} W_{Des} + x_{Des,CGO} W_{Des} + 15.2,$$

where U represents a calorific value for each product as refinery fuel, and W is a fuel consumption coefficient for each processing unit in the refinery. Illustrative values for U and W are shown in Tables 1-2 below.

TABLE 1

Calorific values for RG, LG, and LN.

| | Calorific value |
|---|---|
| $U_{RG}$ | 1.3 |
| $U_{LG}$ | 1.2 |
| $U_{LN}$ | 1.1 |

TABLE 2

Fuel consumption coefficients for processing units in various modes.

| | Fuel Consumption Coefficient |
|---|---|
| $W_{C_i}$ | 0.018 |
| $W_{Cr,Mogas}$ | 0.007 |
| $W_{Cr,AGO}$ | 0.007 |
| $W_{R,Sev95}$ | 0.019 |
| $W_{R,Sev100}$ | 0.026 |
| $W_{ISO}$ | 0.04 |
| $W_{Des}$ | 0.02 |

Importation

In order to meet a lower bound on market demand and a quality threshold defined in a specification for diesel (e.g., no more than 15 ppm sulfur), a refinery may import higher quality diesel and blend the imported diesel with diesel produced by the refinery to reduce sulfur fraction of the latter. This approach may involve considerable additional expenses.

In some embodiments, 10 ppm sulfur diesel may be imported. The cost for imported diesel may be determined by real market price, or the following Equation 1:

$$\text{Cost}_{Diesel,Import} = \theta \cdot \text{Price}_{Diesel}, \qquad (1)$$

where $\theta > 1$ is a penalty factor determined by an importance of the sulfur quality threshold and $\text{Price}_{Diesel}$ is market price of 15 ppm diesel.

In some embodiments, to reduce sulfur fraction of a product, a refinery operator may use one or more different approaches in addition to, or instead of, blending with higher quality diesel. However, the inventors have recognized and appreciated that all mitigation approaches involve additional operational costs and/or infrastructure investment. Therefore, regardless of the type of sulfur reduction strategy actually employed, it may be desirable to model a mitigation penalty, for example, using a penalty factor as shown in Equation 1 above. Additionally, or alternatively, it may be desirable to model penalties for having to perform mitigation processing on other types of off-spec products. Penalty factors may be used for such off-spec products, although aspects of the present disclosure are not so limited.

Market Demands

In some embodiments, some refinery products such as PG98, DIESEL and HF may be subject to market demand. In this example, a lower bound on market demand for each of these products is used. However, it should be appreciated that aspects of the present disclosure are not limited to the use of lower bounds. For instance, in some embodiments, an upper bound may be used instead of, or in addition to, a lower bound.

Furthermore, although market demands are specified deterministically in this example, it should be appreciated that aspects of the present disclosure are not so limited. In some embodiments, market demands may be represented as random variables that are realized via scenario generation, for example, as discussed above in connection with FIG. 4.

PG98 Demand:

$$x_{PG98,Export}=x_{PG98,LG}+x_{PG98,ISO}+x_{PG98,LN}+ \\ x_{PG98,R100}+x_{PG98,R95}+x_{PG98,CN} \geq 5.$$

AGO/DIESEL Demand:

$$x_{DIESEL,Export}=x_{DIESEL,KE}+\Sigma_i(x_{DIESEL,GO_i}+ \\ x_{DIESEL,DESGO_i})+x_{DIESEL,CGO}+x_{DIESEL,DESCGO}+ \\ x_{DIESEL,Import} \geq 100.$$

HF Demand:

$$x_{HF,Export}=\Sigma_i x_{HF,VR_i}+x_{HF,CGO} \geq 100.$$

Capacity Limitations

In some embodiments, one or more constraints in a stochastic programming model may be based on capacity limits for processing units in a refinery.

Distillation Capacity:

$$\Sigma_i z_{D,C_i} \geq 700.$$

Reformer Capacity:

$$x_{R,HN,Sev95}+x_{R,HN,Sev100} \geq 65.$$

Cracker Capacity:

$$x_{Cr,VGO,Mogas}+x_{Cr,VGO,AGO} \geq 135.$$

Desulphurization Capacity:

$$\Sigma_i x_{Des,GO_i}+x_{Des,CGO} \geq 125.$$

Quality Specifications

In some embodiments, a product specification may impose one or more quality requirements. Examples of such requirements include, but are not limited to, requirements relating to research octane number (RON), sensitivity, butane content, sulfur, vapor pressure, and/or viscosity. The inventors have recognized and appreciated that, in some instances, linear models may not adequately reflect how various flows interact in a real-life refinery.

As one example, LG may flow from a reformer, a cracker, and a CDU, and may be mixed in a pipeline and then split for producing different products. This may create a pooling problem described by bilinear equations. As another example, a cracker may work in dual severities, and two output flows of CGO may be mixed in a pipeline or buffer tank and then split for various purposes.

In some embodiments, a linear mixing rule and a classical pq-formulation[6] may be used to generate a bilinear model for properties of gasoline, diesel, and/or HF. However, it should be appreciated that other methods for generating bilinear models may also be used, including, but not limited to, a Lagrangian relaxation method.

[6] See, e.g., Tawarmalani, M., Sahinidis, N. V., *Convexication and global optimization in continuous and mixed-integer nonlinear programming: theory, algorithms, software, and applications, nonconvex optimization and its applications*, Kluwer Academic Publishers, the Netherlands, 2002.

LG Properties and Related Specifications

In some embodiments, one or more properties of PG98 and ES95 (e.g., RON, sensitivity, and/or vapor pressure) may depend on qualities of one or more inflows (e.g., LG, ISO, LN, R95, R100, and/or CN). As discussed above, LG flows may be blended and then split, and therefore properties of the LG flows may be described by bilinear equations.

Figure 5:
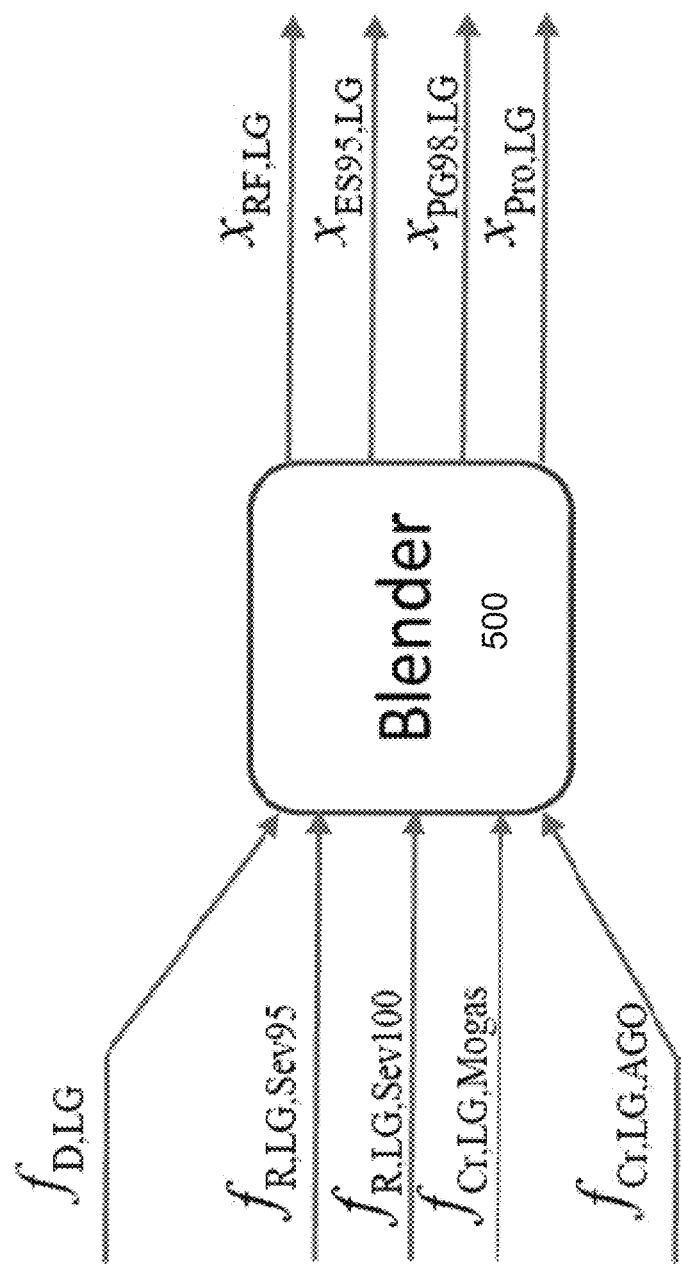
FIG. 5 shows, schematically, pooling (i.e., blending and then splitting) of LG at an illustrative blender 500 with five inflows and four outflows, in accordance with some embodiments.

FIG. 5 shows, schematically, pooling (i.e., blending and then splitting) of LG at an illustrative blender 500 with five inflows and four outflows, in accordance with some embodiments. The blender 500 may, although need not, represent a physical blending tank.

In the example shown in FIG. 5, each variable f represents the proportion of the corresponding inflow in the total outflow, while flow rate variables x are used for the outflows.

The inventors have recognized and appreciated that modeling inflows using the flow fractions f, instead of flow rates x, may allow application of a pq-formulation,[7] which may be favorable for global optimization. However, it should be appreciated that aspects of the present disclosure are not so limited, as in some embodiments flow rates x may be used to model inflows, instead of, or in addition to, flow fractions f. Likewise, in some embodiments, flow fractions f may be used to model outflows, instead of, or in addition to, flow rates x.

[7] Id.

In some embodiments, bilinear terms b may be introduced to represent products of flow rates x and flow fractions f. For instance, bilinear terms for products of LG and ES95 may be:

$$b_{ES95,D}=x_{ES95,LG}f_{D,LG},$$
$$b_{ES95,Sev95}=x_{ES95,LG}f_{R,LG,Sev95},$$
$$b_{ES95,Sev100}=x_{ES95,LG}f_{R,LG,Sev100},$$
$$b_{ES95,Mogas}=x_{ES95,LG}f_{Cr,LG,Mogas},$$
$$b_{ES95,AGO}=x_{ES95,LG}f_{Cr,LG,AGO}.$$

Bilinear terms for products of LG and PG98 may be:

$$b_{PG98,D}=x_{PG98,LG}f_{D,LG},$$
$$b_{PG98,Sev95}=x_{PG98,LG}f_{R,LG,Sev95},$$
$$b_{PG98,Sev100}=x_{PG98,LG}f_{R,LG,Sev100},$$
$$b_{PG98,Mogas}=x_{PG98,LG}f_{Cr,LG,Mogas},$$
$$b_{PG98,AGO}=x_{PG98,LG}f_{Cr,LG,AGO}.$$

Bilinear terms for products of LG and refinery fuel may be:

$$b_{RF,D}=x_{RF,LG}f_{D,LG},$$
$$b_{RF,Sev95}=x_{RF,LG}f_{R,LG,Sev95},$$
$$b_{RF,Sev100}=x_{RF,LG}f_{R,LG,Sev100},$$
$$b_{RF,Mogas}=x_{RF,LG}f_{Cr,LG,Mogas},$$
$$b_{RF,AGO}=x_{RF,LG}f_{Cr,LG,AGO}.$$

In some embodiments, an amount $x_{Pro,LG}$ of LG produced by a refinery may be sold to the market. Bilinear terms related to $x_{Pro,LG}$ may be:

$$b_{Pro,D}=x_{Pro,LG}f_{D,LG},$$
$$b_{Pro,Sev95}=x_{Pro,LG}f_{R,LG,Sev95},$$
$$b_{Pro,Sev100}=x_{Pro,LG}f_{R,LG,Sev100},$$
$$b_{Pro,Mogas}=x_{Pro,LG}f_{Cr,LG,Mogas},$$
$$b_{Pro,AGO}=x_{Pro,LG}f_{Cr,LG,AGO}.$$

In some embodiments, one or more consistency constraints may be imposed, such as the proportions of inputs summing to one:

$$f_{D,LG}+f_{R,LG,Sev95}+f_{R,LG,Sev100}+f_{Cr,LG,Mogas}+ \\ f_{Cr,LG,AGO}=1.$$

In some embodiments, LG productions from distillation of different crudes, a cracker operating in two severities, and a reformer operating in two modes may be represented by the following equations:

$$b_{ES95,D}+b_{PG98,D}+b_{RF,D}+b_{Pro,D}=\Sigma_i z_{D,C_i} P_{D,LG,C_i}, \quad (2)$$

$$b_{ES95,Sev95}+b_{PG98,Sev95}+b_{RF,Sev95}+b_{Pro,Sev95}= \\ x_{R,HN,Sev95}P_{R,LG,Sev95},$$

$$b_{ES95,Sev100}+b_{PG98,Sev100}+b_{RF,Sev100}+b_{Pro,Sev100}= \\ x_{R,HN,Sev100}P_{R,LG,Sev100},$$

$$b_{ES95,Mogas}+b_{PG98,Mogas}+b_{RF,Mogas}+b_{Pro,Mogas}= \\ x_{Cr,VGO,Mogas}P_{Cr,LG,Mogas},$$

$$b_{ES95,AGO}+b_{PG98,AGO}+b_{RF,AGO}+b_{Pro,AGO}= \\ x_{Cr,VGO,AGO}P_{Cr,LG,AGO}.$$

In some embodiments, a pq-formulation may be used to tighten a convex relaxation formulation. An illustrative pq-formulation is shown below. However, it should be appreciated that aspects of the present disclosure are not limited to the use of a pq-formulation.

$$b_{ES95,D} + b_{ES95,Sev95} + b_{ES95,Sev100} + b_{ES95,Mogas} + b_{ES95,AGO} = x_{ES95,LG},$$

$$b_{PG98,D} + b_{PG98,Sev95} + b_{PG98,Sev100} + b_{PG98,Mogas} + b_{PG98,AGO} = x_{PG98,LG},$$

$$b_{RF,D} + b_{RF,Sev95} + b_{RF,Sev100} + b_{RF,Mogas} + b_{RF,AGO} = x_{RF,LG},$$

$$b_{Pro,D} + b_{Pro,Sev95} + b_{Pro,Sev100} + b_{Pro,Mogas} + b_{Pro,AGO} = x_{Pro,LG}.$$

In some embodiments, mass-based variables may be converted into volume-based variables. This may advantageously allow application of volume-based mixing laws. For instance, volumes of ES95 and PG98 may be expressed as:

$$v_{ES95} = \frac{x_{ES95,LG}}{\rho_{LG}} + \frac{x_{ES95,ISO}}{\rho_{ISO}} + \frac{x_{ES95,LN}}{\rho_{LN}} + \frac{x_{ES95,R95}}{\rho_{R95}} + \frac{x_{ES95,R100}}{\rho_{R100}} + \frac{x_{ES95,CN}}{\rho_{CN}},$$

$$v_{PG98} = \frac{x_{PG98,LG}}{\rho_{LG}} + \frac{x_{PG98,ISO}}{\rho_{ISO}} + \frac{x_{PG98,LN}}{\rho_{LN}} + \frac{x_{PG98,R95}}{\rho_{R95}} + \frac{x_{PG98,R100}}{\rho_{R100}} + \frac{x_{PG98,CN}}{\rho_{CN}},$$

where v represents volume and ρ represents density.

Illustrative values for densities of inflows to gasoline are shown in Table 3.

TABLE 3

Density of inflows to gasoline.

| | LG | ISO | LN | R95 | R100 | CN |
|---|---|---|---|---|---|---|
| Density (kT/m³) | 0.58 | 0.665 | 0.65 | 0.77 | 0.80 | 0.75 |

In some embodiments, one or more quality constraints may be formulated based on one or more bilinear questions, such as those described above.

Vapor Pressure of ES95:

$$0.45 v_{ES95} \leq \frac{x_{ES95,ISO} V_{ES95,ISO}}{\rho_{ISO}} + \frac{x_{ES95,LN} V_{ES95,LN}}{\rho_{LN}} + \frac{x_{ES95,R95} V_{ES95,R95}}{\rho_{R95}} + \frac{x_{ES95,R100} V_{ES95,R100}}{\rho_{R100}} + \frac{x_{ES95,CN} V_{ES95,CN}}{\rho_{CN}} + \frac{b_{ES95,D} V_{D,LG}}{\rho_{LG}} + \frac{b_{ES95,Sev95} V_{R,LG,Sev95}}{\rho_{LG}} + \frac{b_{ES95,Sev100} V_{R,LG,Sev100}}{\rho_{LG}} + \frac{b_{ES95,Mogas} V_{Cr,LG,Mogas}}{\rho_{LG}} + \frac{b_{ES95,AGO} V_{Cr,LG,AGO}}{\rho_{LG}} \leq 0.8 v_{ES95},$$

where V represents vapor pressure.

Vapor Pressure of PG98:

$$0.5 v_{PG98} \leq \frac{x_{PG98,ISO} V_{PG98,ISO}}{\rho_{ISO}} + \frac{x_{PG98,LN} V_{PG98,LN}}{\rho_{LN}} + \frac{x_{PG98,R95} V_{PG98,R95}}{\rho_{R95}} + \frac{x_{PG98,R100} V_{PG98,R100}}{\rho_{R100}} + \frac{x_{PG98,CN} V_{PG98,CN}}{\rho_{CN}} + \frac{b_{PG98,D} V_{D,LG}}{\rho_{LG}} + \frac{b_{PG98,Sev95} V_{R,LG,Sev95}}{\rho_{LG}} + \frac{b_{PG98,Sev100} V_{R,LG,Sev100}}{\rho_{LG}} + \frac{b_{PG98,Mogas} V_{Cr,LG,Mogas}}{\rho_{LG}} + \frac{b_{PG98,AGO} V_{Cr,LG,AGO}}{\rho_{LG}} \leq 0.86 v_{PG98},$$

where V represents vapor pressure.

RON of PG98:

$$\frac{x_{PG98,ISO} RON_{ISO}}{\rho_{ISO}} + \frac{x_{PG98,LN} RON_{LN}}{\rho_{LN}} + \frac{x_{PG98,R95} RON_{R95}}{\rho_{R95}} + \frac{x_{PG98,R100} RON_{R100}}{\rho_{R100}} + \frac{x_{PG98,CN} RON_{CN}}{\rho_{CN}} + \frac{b_{PG98,D} RON_{D,LG}}{\rho_{LG}} + \frac{b_{PG98,Sev95} RON_{LG,Sev95}}{\rho_{LG}} + \frac{b_{PG98,Sev100} RON_{LG,Sev100}}{\rho_{LG}} + \frac{b_{PG98,Mogas} RON_{LG,Mogas}}{\rho_{LG}} + \frac{b_{PG98,AGO} RON_{LG,AGO}}{\rho_{LG}} \leq 98 v_{PG98},$$

where RON represents research octane number.

RON of ES95:

$$\frac{x_{ES95,ISO} RON_{ISO}}{\rho_{ISO}} + \frac{x_{ES95,LN} RON_{LN}}{\rho_{LN}} + \frac{x_{ES95,R95} RON_{R95}}{\rho_{R95}} + \frac{x_{ES95,R100} RON_{R100}}{\rho_{R100}} + \frac{x_{ES95,CN} RON_{CN}}{\rho_{CN}} + \frac{b_{ES95,D} RON_{D,LG}}{\rho_{LG}} + \frac{b_{ES95,Sev95} RON_{LG,Sev95}}{\rho_{LG}} + \frac{b_{ES95,Sev100} RON_{LG,Sev100}}{\rho_{LG}} + \frac{b_{ES95,Mogas} RON_{LG,Mogas}}{\rho_{LG}} + \frac{b_{ES95,AGO} RON_{LG,AGO}}{\rho_{LG}} \leq 95 v_{ES95},$$

where RON represents research octane number.

Sensitivity of ES95:

$$\frac{x_{ES95,ISO} Sen_{ISO}}{\rho_{ISO}} + \frac{x_{ES95,LN} Sen_{LN}}{\rho_{LN}} + \frac{x_{ES95,R95} Sen_{R95}}{\rho_{R95}} + \frac{x_{ES95,R100} Sen_{R100}}{\rho_{R100}} + \frac{x_{ES95,CN} Sen_{CN}}{\rho_{CN}} + \frac{b_{ES95,D} Sen_{D,LG}}{\rho_{LG}} + \frac{b_{ES95,Sev95} Sen_{LG,Sev95}}{\rho_{LG}} + \frac{b_{ES95,Sev100} Sen_{LG,Sev100}}{\rho_{LG}} + \frac{b_{ES95,Mogas} Sen_{LG,Mogas}}{\rho_{LG}} + \frac{b_{ES95,AGO} Sen_{LG,AGO}}{\rho_{LG}} \leq 10 v_{ES95},$$

where Sen represents sensitivity.

Sensitivity of PG98:

$$\frac{x_{PG98,ISO} Sen_{ISO}}{\rho_{ISO}} + \frac{x_{PG98,LN} Sen_{LN}}{\rho_{LN}} + \frac{x_{PG98,R95} Sen_{R95}}{\rho_{R95}} + \frac{x_{PG98,R100} Sen_{R100}}{\rho_{R100}} + \frac{x_{PG98,CN} Sen_{CN}}{\rho_{CN}} + \frac{b_{PG98,D} Sen_{D,LG}}{\rho_{LG}} + \frac{b_{PG98,Sev95} Sen_{LG,Sev95}}{\rho_{LG}} + \frac{b_{PG98,Sev100} Sen_{LG,Sev100}}{\rho_{LG}} + \frac{b_{PG98,Mogas} Sen_{LG,Mogas}}{\rho_{LG}} + \frac{b_{PG98,AGO} Sen_{LG,AGO}}{\rho_{LG}} \leq 10 v_{PG98},$$

where Sen represents sensitivity.

Butane Content of ES95:

$$\frac{x_{ES95,LG}}{\rho_{LG}} \leq 0.05 v_{ES95}.$$

Butane Content of PG98:

$$\frac{x_{PG98,LG}}{\rho_{LG}} \leq 0.05 v_{PG98}.$$

Illustrative quality thresholds for gasoline are shown in Table 4 below. As discussed above, such thresholds may be defined in a specification (e.g., government regulation, customer contract, etc.). In this example, sensitivity is the difference between research octane number (RON) and motor octane number (MON).

TABLE 4

Specifications for gasoline ES95 and PG98.

|  | Upper bound | Lower bound |
|---|---|---|
| Vapor pressure (ES95) | 0.8 | 0.45 |
| Vapor pressure (PG98) | 0.8 | 0.45 |
| RON (ES95) | n/a | 95 |
| RON (PG98) | n/a | 98 |
| Sensitivity (ES95) | 10 | n/a |
| Sensitivity (PG98) | 10 | n/a |
| Butane (ES95) | 0.05 | n/a |
| Butane (PG98) | 0.05 | n/a |

CGO Properties and Related Quality Specification

Some environmental regulations require sulfur fraction of diesel to be less than 15 ppm. The inventors have recognized and appreciated that sulfur in diesel may depend on quality of one or more feedstocks (e.g., $GO_i$, $DESGO_i$, CGO, DESCGO, and/or KE). Since a cracker may work in dual modes, two CGO streams, produced respectively by the two modes, may be mixed in a pipeline and split for producing DIESEL and HF. Therefore, properties of the CGO flows may be described by bilinear equations.

Figure 6:
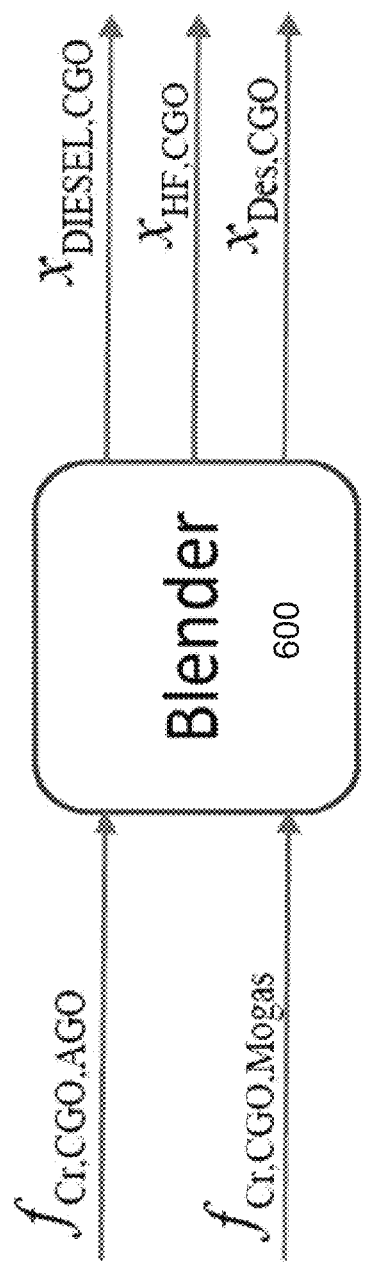
FIG. 6 shows, schematically, pooling (i.e., blending and then splitting) of CGO at an illustrative blender 600 with two inflows and three outflows, in accordance with some embodiments.

FIG. 6 shows, schematically, pooling (i.e., blending and then splitting) of CGO at an illustrative blender 600 with two inflows and three outflows, in accordance with some embodiments. The blender 600 may, although need not, represent a physical blending tank.

Like in the example shown in FIG. 5, each variable f represents the proportion of the corresponding inflow in the total outflow, while flow rate variables x are used for the outflows. In some embodiments, bilinear terms b may be introduced to represent products of flow rates x and flow fractions f. For instance, bilinear terms for CGO flowing into DIESEL may be:

$b_{DIESEL,AGO} = f_{Cr,CGO,AGO} x_{DIESEL,CGO}$,
$b_{DIESEL,Mogas} = f_{Cr,CGO,Mogas} x_{DIESEL,CGO}$.

Bilinear terms for CGO flowing into HF may be:

$b_{HF,AGO} = f_{Cr,CGO,AGO} x_{HF,CGO}$,
$b_{HF,Mogas} = f_{Cr,CGO,Mogas} x_{HF,CGO}$.

Bilinear terms for CGO flowing into a desulphurization unit may be:

$b_{Des,AGO} = f_{Cr,CGO,AGO} x_{Des,CGO}$,
$b_{Des,Mogas} = f_{Cr,CGO,Mogas} x_{Des,CGO}$.

In some embodiments, one or more consistency constraints may be imposed, such as the proportions of inputs summing to one:

$f_{Cr,CGO,AGO} + f_{Cr,CGO,Mogas} = 1$.

In some embodiments, CGO productions from a reformer operating in two modes may be represented by the following equations:

$b_{DIESEL,AGO} + b_{HF,AGO} + b_{Des,AGO} = x_{Cr,VGO,AGO} P_{Cr,CGO,AGO}$, $b_{DIESEL,Mogas} + b_{HF,Mogas} + b_{Des,Mogas} = x_{Cr,VGO,Mogas} P_{Cr,CGO,Mogas}$.

In some embodiments, a pq-formulation may be used to accelerate global optimization. An illustrative pq-formulation is shown below. However, it should be appreciated that aspects of the present disclosure are not limited to the use of a pq-formulation.

$b_{DIESEL,AGO} + b_{DIESEL,Mogas} = x_{DIESEL,CGO}$, $b_{HF,AGO} + b_{HF,Mogas} = x_{HF,CGO}$, $b_{Des,AGO} + b_{Des,Mogas} = x_{Des,CGO}$.

In some embodiments, one or more quality constraints for diesel may be formulated based on one or more bilinear questions for CGO, such as those described above.

Sulfur: In some embodiments, a mass-based quality constraint relating to sulfur within a diesel mixture may be formulated, for example, with an upper limit of 15 ppm:

$\Sigma_i x_{DIESEL,GO_i} S_{DIESEL,GO_i} + \Sigma_i x_{DIESEL,DESGO_i} S_{DIESEL,DESGO_i} + x_{DIESEL,KE} S_{DIESEL,KE} + x_{DIESEL,Import} S_{DIESEL,Import} + x_{DIESEL,DESCGO} S_{DIESEL,DESCGO} + b_{DIESEL,AGO} S_{Cr,CGO,AGO} + b_{DIESEL,Mogas} S_{Cr,CGO,Mogas} \leq 0.0015 \% (\Sigma_i (x_{DIESEL,GO_i} + x_{DIESEL,DESGO_i}) + x_{DIESEL,KE} + x_{DIESEL,DESCGO} + x_{DIESEL,CGO} + x_{DIESEL,Import})$, where S presents sulfur percentage in a flow.

In this example, a desulfurization unit may be able to remove 99.5% of sulfur from an inflow, as expressed below. However, it should be appreciated that aspects of the present disclosure are not so limited, as different desulfurization equipment may perform differently.

$S_{DIESEL,DESGO_i} = 0.005 S_{DIESEL,GO_i}$, $S_{DIESEL,DESCGO} = 0.005 S_{DIESEL,CGO}$.

In some embodiments, one or more quality constraints for HF may be formulated based on one or more bilinear questions for CGO, such as those described above.

Viscosity: In some embodiments, a volume-based quality constraint relating to viscosity of HF may be formulated, for example, with a desired range of viscosity index of [30,33]:

$$30 v_{HF} \leq \frac{\sum_i x_{HF,VR_i} Vis_{HF,VR_i}}{\rho_{VR_i}} + \frac{b_{HF,AGO} Vis_{Cr,CGO,AGO}}{\rho_{CGO}} + \frac{b_{HF,Mogas} Vis_{Cr,CGO,Mogas}}{\rho_{CGO}} \leq 33 v_{HF},$$

where V is represents viscosity.

Illustrative quality thresholds for diesel and HF are shown in Table 5 below. As discussed above, such thresholds may be defined in a specification (e.g., government regulation, customer contract, etc.).

TABLE 5

Specifications of diesel and HF.

|  | Upper bound | Lower bound |
|---|---|---|
| Sulfur (ppm) | 15 | n/a |
| Viscosity index | 33 | 30 |

Uncertainties

The inventors have recognized and appreciated that properties of crudes may vary due to numerous factors. In view of such variations, a refinery may frequently adjust operations, for example, to avoid production of off-spec products, and/or to reduce costs.

The inventors have further recognized and appreciated potential disadvantages of some deterministic decision making methods. For example, although an optimal solution obtained based on nominal parameter values may achieve high profit in the nominal case, such a solution may lead to serious losses in other cases. Therefore, it may be desirable to take uncertainties into account and ensure that a solution is sufficiently robust to parameter perturbations.

For purposes of illustration, examples are provided herein where each crude candidate may have two uncertain parameters, vacuum residue yield and sulfur fraction of gas oil. The inventors have recognized and appreciated that these parameters may have a significant impact on final product quality and/or refinery profitability. For instance, vacuum residue may be a less valuable part of crude oils, and therefore higher vacuum residue yield may result in lower revenue. Furthermore, quality of produced diesel may be sensitive to variations in sulfur fraction of gas oil in input crude oils, for example, when a desulfurization unit is operating at full capacity. However, it should be appreciated that aspects of the present disclosure are not limited to the use of these uncertain parameters, as in some embodiments crude candidates may have only one of vacuum residue yield and sulfur fraction of gas oil as an uncertain parameter. Additionally, or alternatively, crude candidates may have one or more uncertain parameters other than vacuum residue yield and sulfur fraction of gas oil.

In some embodiments, each of vacuum residue yield and sulfur fraction of gas oil is modeled using a univariate Gaussian distribution. Illustrative mean and standard deviation values are shown in Table 6 below for vacuum residue yield and gas oil sulfur fraction distributions for a slate of 10 crude oils.

TABLE 6

Uncertainties.

|  | VR yield mean (%) | VR yield std (%) | GO sulfur mean (%) | GO sulfur std (%) |
|---|---|---|---|---|
| Crude$_1$ | 10.32 | 1.032 | 0.157 | 0.0157 |
| Crude$_2$ | 26.72 | 2.672 | 0.293 | 0.0293 |
| Crude$_3$ | 21.63 | 2.163 | 0.162 | 0.0162 |
| Crude$_4$ | 13.56 | 1.356 | 0.200 | 0.0200 |
| Crude$_5$ | 25.50 | 2.550 | 0.263 | 0.0263 |
| Crude$_6$ | 37.23 | 3.723 | 0.694 | 0.0694 |
| Crude$_7$ | 10.86 | 1.086 | 0.767 | 0.0767 |
| Crude$_8$ | 26.20 | 2.620 | 1.550 | 0.1550 |
| Crude$_9$ | 20.09 | 2.009 | 0.326 | 0.0326 |
| Crude$_{10}$ | 27.59 | 2.759 | 1.090 | 0.1090 |

In some embodiments, a plurality of scenarios (e.g., 120) may be generated, for example, by independently sampling probability distributions of vacuum residue yield and gas oil sulfur fraction for all crude oil candidates. Thus, in an example with a slate of 10 crude oil candidates, each scenario may include a vector of 20 values—two values for each candidate, $P_{D,VR_iC_i}$ and $S_{GO_i}$, $i \in \{1, 2, \ldots, 10\}$, corresponding, respectively, to the vacuum residue yield and the sulfur fraction of gas oil for that candidate. These scenarios may be generated at act 305 of the illustrative process 300 shown in FIG. 3.

Any suitable sampling method may be used, including, but not limited to, Monte Carlo sampling. The inventors have recognized and appreciated that a more robust solution may be obtained by generating a larger number of scenarios. However, it should be appreciated that aspects of the present disclosure are not limited to the generation of any particular number of scenarios.

In some embodiments, once $P_{D,VR_iC_i}$ is determined via sampling, yields of other components may be re-normalized to ensure that all yields sum to one.

Two-Stage Stochastic Programming Model

In some embodiments, a formulation of a two-stage stochastic programming model may be provided for optimizing crude procurement and/or refinery operations. The inventors have recognized and appreciated that an optimization problem subject to uncertainties may be converted into a deterministic counterpart. For example, by generating H scenarios of uncertain parameters and assuming that all scenarios occur with equal probability, an expectation of some function to be optimized may be calculated deterministically for each strategy, where each strategy may include a combination of crudes to be procured (including an amount to be procured for each crude) and/or a set of operational controls (e.g., flow rates, cut point temperatures, etc.). A strategy that results in a highest or lowest expectation of the function may then be selected, depending on whether the function is to be maximized or minimized.

In some embodiments, an optimal combination of crudes to be procured, including amount to be procured for each crude, may be determined by maximizing an expected profit at Stage I of a scenario-based stochastic programming model. An illustrative formulation for Stage I may be as follows:

$$\min_{x^h, b^h, v^h, f^h, d, z} \sum_{i=1}^{10} \overline{Price_{C_i}} z_{D,C_i} + \sum_{h=1}^{H} \frac{a^T x^h}{H} \quad (P)$$

s.t.

$d_{C_i} \underline{z}_{C_i} \leq z_{D,C_i} \leq d_{C_i} \overline{z}_{C_i}, \forall i \in \{1, 2, \ldots, 10\}$, $F^h(x^h, v^h, f^h, z, b^h) \leq 0, \forall h \in \{1, 2, \ldots, H\}$, $b^h_{jk} = x^h_j f^h_k, \forall (j, k) \in \Gamma, \forall h \in \{1, 2, \ldots, H\}$, $\underline{x}^h_j \leq x^h_j \leq \overline{x}^h_j, \underline{f}^h_k \leq f^h_k \leq \overline{f}^h_k, \forall (j, k) \in \Gamma$, $\forall h \in \{1, 2, \ldots, H\}$, $(x^h, v^h, f^h) \in \Omega^h, \forall h \in \{1, 2, \ldots, H\}$, $d_{C_i} \in \{0, 1\}, \forall i \in \{1, \ldots, 10\}$, where:
$\overline{Price_{C_i}}$ denotes crude oil price with unit $/kT;
$x^h$, $v^h$, $f^h$ are, respectively, flow, volume, and fraction vectors that lie in a compact and convex set $\Omega^h$;
for each component of vectors $x^h$, $f^h$, a box constraint is enforced explicitly;
i represents a crude oil index;
binary decision variable $d_{C_i}$ indicates whether a crude is selected;
$\underline{z}_{C_i}$ and $\overline{z}_{C_i}$ denote, respectively, lower and upper bounds of procurement if an order for crude $C_i$ is placed;
superscript h represents a scenario index and H denotes a total number of scenarios (e.g., 120);
for scenario h, polyhedral constraints denoted by $F^h$ represent all mass balance, importation, capacity limitation, market demand and quality constraints, where there are M constraints in total;

Γ is an index set representing variables involved in relevant bilinear terms; and $a^T x^h$ denotes operating costs minus sales at scenario h for one month, as shown in Equation 3 below.

$$a^T x^h = 10^3 \times \qquad (3)$$

$$\Bigg( (x_{Cr,CGO,Mogas} + x_{Cr,CGO,AGO}) \cdot Cost_{Cr} + x_{R,HN,Sev95} \cdot Cost_{R,Sev95} +$$

$$x_{R,HN,Sev100} \cdot Cost_{R,Sev100} + x_{ISO,LN} \cdot Cost_{ISO} +$$

$$\sum_i x_{DESGO_i} \cdot Cost_{DESGO_i} + x_{Des,CGO} \cdot Cost_{DESCGO} +$$

$$x_{DIESEL,Import} \cdot Cost_{DIESEL,Import} - x_{LG,Export} \cdot Price_{LG} -$$

$$x_{LN,Export} \cdot Price_{LN} - x_{ES95,Export} \cdot Price_{ES95} -$$

$$x_{PG98,Export} \cdot Price_{PG98} - x_{Jet,Export} \cdot Price_{Jet} -$$

$$x_{DIESEL,Export} \cdot Price_{DIESEL} - x_{HF,Export} \cdot Price_{HF} \Bigg)$$

It should be appreciated that aspects of the present disclosure are not limited to using a uniform distribution over all scenarios generated at Stage I, as other distributions may also be suitable.

In some embodiments, at Stage II of the stochastic programming model, uncertainties relating to crude oil quality may have been realized, and optimal refinery operations may be determined. For instance, Stage II may represent a point in a decision making process where procured crude oils have arrived at a refinery and therefore properties of the procured crudes may be ascertained (e.g., by taking physical measurements).

Because the uncertainties relating to crude oil quality may have been realized, there may be only one scenario, and Stage II may involve a deterministic problem. An illustrative formulation for stage II may be as follows. There may be no scenario index h in this formulation because a scenario has been fixed. Moreover, z may be known from a decision made at Stage I.

$$\min_{x,b,v,f} a^T x \qquad (4)$$

s.t.

$$F(x, v, f, z, b) \le 0,$$

$$b_{jk} = x_j f_k, \forall (j, k) \in \Gamma,$$

$$\underline{x}_j \le x_j \le \overline{x}_j, \underline{f}_k \le f_k \le \overline{f}_k, \forall (j, k) \in \Gamma, (x, v, f) \in \Omega.$$

It should be appreciated that realized crude properties at Stage II may be different from any of the scenarios generated at Stage I.

Illustrative values for various costs and prices used in this example are shown in Tables 7-9 below.

TABLE 7

Prices and desulfurization costs.

| Crudes or CGO | $Price_{c_i}$ ($ per barrel) | $Cost_{DESGO_i}$ or $Cost_{DESCGO}$ ($ per tonne) |
|---|---|---|
| $C_1$ | 115.00 | 2.404 |
| $C_2$ | 107.50 | 2.473 |

TABLE 7-continued

Prices and desulfurization costs.

| Crudes or CGO | $Price_{c_i}$ ($ per barrel) | $Cost_{DESGO_i}$ or $Cost_{DESCGO}$ ($ per tonne) |
|---|---|---|
| $C_3$ | 109.70 | 2.435 |
| $C_4$ | 110.70 | 2.450 |
| $C_5$ | 108.40 | 2.458 |
| $C_6$ | 101.60 | 2.715 |
| $C_7$ | 114.30 | 2.857 |
| $C_8$ | 101.30 | 3.375 |
| $C_9$ | 109.40 | 2.529 |
| $C_{10}$ | 104.09 | 3.026 |
| CGO | n/a | 3.346 |

The crude oil prices shown in Table 7 were obtained from public sources such as the U.S. Energy Information Administration (EIA). Major desulfurization cost may be proportional to hydrogen consumption,[8] which may depend on feed sulfur fraction of GO or CGO.[9]

[8] See, e.g., Brossard, D. N., *Handbook of petroleum refining processes*, McGraw-Hill, 2003.

[9] See, e.g., Maples, R. E., *Petroleum refinery process economics*, PennWell Corporation, 2000.

TABLE 8

Refinery processing costs.

| Processing Cost | ($ per tonne) |
|---|---|
| $Cost_{cr}$ | 3.0 |
| $Cost_{R,Sev95}$ | 2.7 |
| $Cost_{R,Sev100}$ | 3.2 |
| $Cost_{ISO}$ | 0.6 |
| $Cost_{DIESEL,Import}$ | 907 · θ |

The parameter θ shown in Table 8 may be used as a penalty factor to calculate a price of imported high quality diesel, as discussed above.

TABLE 9

Products prices.

| | Product price ($ per tonne) |
|---|---|
| $Price_{LN}$ | 1003 |
| $Price_{LG}$ | 561.6 |
| $Price_{ES95}$ | 1194 |
| $Price_{PG98}$ | 1231 |
| $Price_{Jet}$ | 923 |
| $Price_{DIESEL}$ | 907 |
| $Price_{HF}$ | 637 |

Although fixed prices are used in this example, aspects of the present disclosure are not so limited. In some embodiments, price fluctuations may be represented explicitly in a two-stage stochastic programming model. The inventors have recognized and appreciated that prices of final products may fluctuate periodically or randomly, and there may be a well-established probability distribution that may be used to generate pricing scenarios. Additionally, or alternatively, historical data may be used to generate scenarios directly, and/or to generate a probability distribution, which may then be sampled to generate scenarios. In some embodiments, the scenarios may be taken into account at Stage I of a stochastic programming model, and refinery operations may be determined once prices are realized and known, at Stage II of a stochastic programming model.

Returning to FIG. 3, the stochastic programming model formulated at act 310 of the illustrative process 300 may be solved at act 315. The inventors have recognized and appreciated that, in some embodiments, Stage I (crude procurement) of a multi-scenario stochastic programming formulation may result in a large-scale mixed-integer nonconvex mathematical programming problem, and that a nonconvex generalized Benders decomposition (NGBD) method[10,11] may be used to find an optimal global solution with moderate solver time. For instance, the inventors have recognized and appreciated that an NGBD algorithm may scale only linearly (as opposed to, say, exponentially) with a number of scenarios.

[10] See, e.g., X. Li, A. Tomasgard, and P. I. Barton, *Nonconvex generalized Benders decomposition for stochastic separable mixed-integer programs*, Journal of Optimization Theory and Applications, 151(3):425-454, 2011.

[11] See, e.g., X. Li, A. Tomasgard, and P. I. Barton, *Decomposition strategy for the stochastic pooling problem*, Journal of Global Optimization, 54:765-790, 2012.

In some embodiments, although a solution obtained at act 315 may not lead to any constraint violation in any scenario sampled at Stage I of the stochastic programming model formulated at act 310, such a solution may lead to a constraint violation in one or more un-sampled scenarios. Therefore, it may be desirable to ensure that a probability of constraint violation is bounded. The inventors have further recognized and appreciated that, under some conditions, given a desired bound on the probability of constraint violation, a sufficiently large number of scenarios may be generated at Stage I so that the probability of constraint violation is no greater than the desired bound. For example, in some embodiments, if each scenario problem is convex in operational decision variables, then a minimum number of scenarios may be determined to ensure that the probability of constraint violation is no greater than a desired bound with a confidence threshold.[12] This minimum number may be an explicit function of a number of refinery operation decision variables, the confidence threshold, and/or the desired bound on the probability of constraint violations. Increasing the number of decision variables and/or the confidence threshold, and/or reducing the bound on the probability of constraint violations may lead to a recommendation that a larger number of scenarios be considered at Stage I.

[12] See, e.g., G. C. Calafiore and M. C. Campi, *The scenario approach to robust control design*, IEEE Transactions on Automatic Control, 2006.

Figure 7:
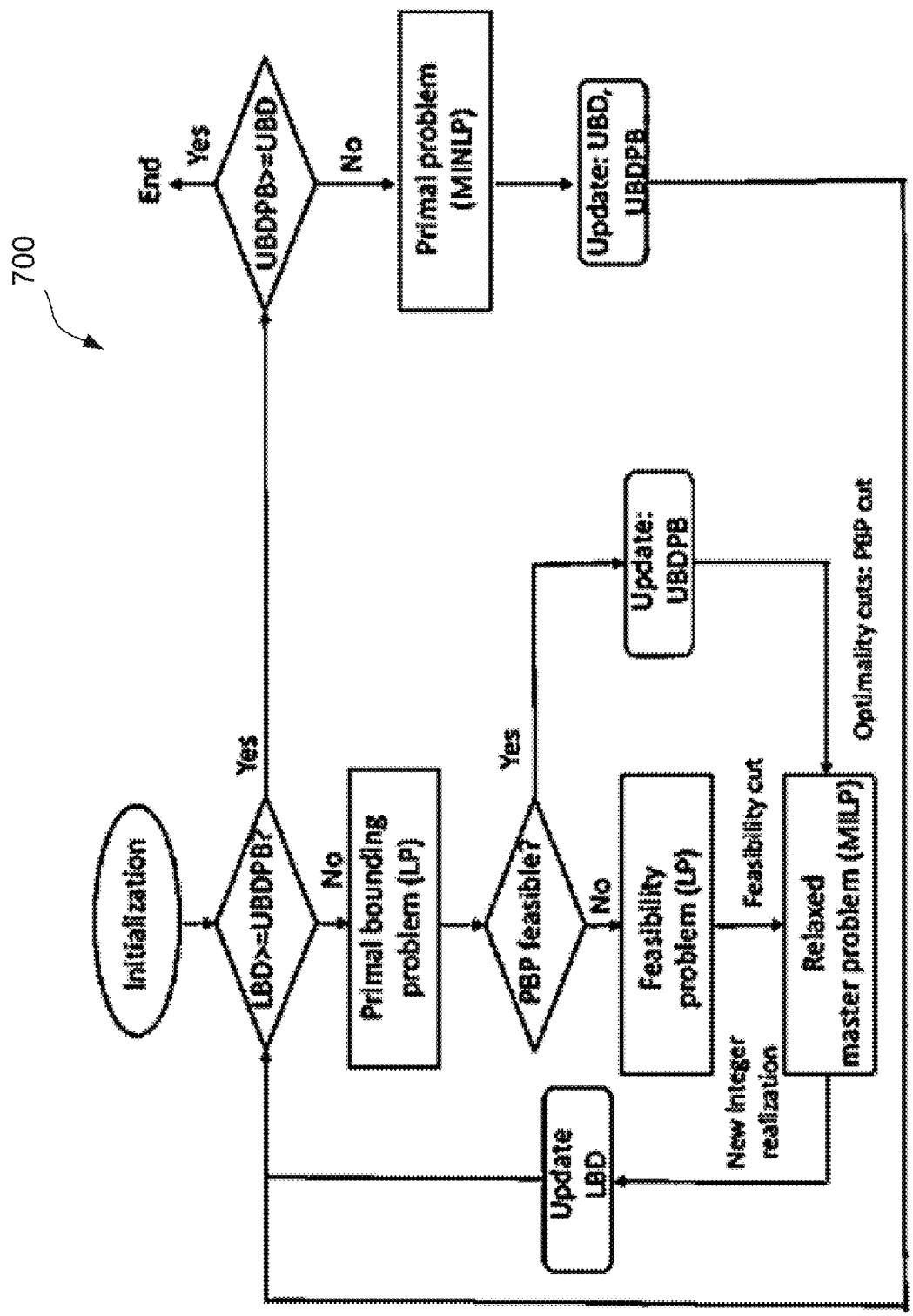
FIG. 7 shows an illustrative process 700 for applying a nonconvex generalized Benders decomposition (NGBD) method to solve a stochastic programming formulation, in accordance with some embodiments.

An illustrative application of an NGBD method is discussed below in connection with FIG. 7. However, it should be appreciated that aspects of the present disclosure are not limited to the use of an NGBD method, as in some embodiments one or more other techniques may be used additionally or alternatively. Examples of such techniques include, but are not limited to, Benders decomposition/L-shaped method,[13,14] generalized Benders decomposition,[15] Lagrangian decomposition,[16] and/or branch-and-bound.[17]

[13] See, e.g., J. F. Benders, *Partitioning procedures for solving mixed-variables programming problems*, Numerische Mathematik, 4:238-252, 1962.

[14] See, e.g., R. M. Van Slyke and R. Wets, *L-shaped linear programs with applications to optimal control and stochastic programming*, SIAM Journal of Applied Mathematcics, 17(4):638-663, 1969.

[15] See, e.g., A. M. Geoffrion, *Generalized Benders decomposition*, Journal of Optimization Theory and Applications, 10(4):237-260, 1972.

[16] See, e.g., C. C. Carøe and R. Schultz, *Dual decomposition in stochastic integer programming*, Operations Research Letters, 24:37-45, 1999.

[17] See, e.g., Reiner Horst and Hoang Tuy, *Global Optimization: Deterministic Approaches*, Springer, N. Y., 3rd edition, 1996.

In some embodiments, a solution obtained at act 315 of the illustrative process 300 shown in FIG. 3 may include a list of crude oils to be procured and/or an amount to be procured for each crude oil. At act 320, one or more crude oils may be procured based on the solution obtained at act 315.

The inventors have recognized and appreciated that, in some embodiments, a Stage II (refinery operations) formulation may result in a single scenario optimization problem. For example, at act 325 of the illustrative process 300 shown in FIG. 3, procured crude oils may have arrived at the refinery, and parameters such as actual crude qualities, market demands, product prices, etc. may have been realized and may be known to a refinery operator. Therefore, a single scenario optimization problem may be solved to optimize some function (e.g., to decrease waste, cost, etc., or to increase output, profit, etc.) while ensuring that one or more constraints are met (e.g., quality thresholds defined in a product specification, emission thresholds defined in an environmental regulation, etc.).

Although details of implementation are described above in connection with FIG. 3, it should be appreciated that aspects of the present disclosure are not limited to such details. For instance, in some embodiments, one or more scenarios and/or stochastic programming models may be generated (or partially generated) ahead of time and stored. Such stored data may be retrieved and updated when an updated solution is desired (e.g., when one or more parameters change, such as available crude quantities, market demands, final product prices, etc.). Furthermore, in some embodiments, one or more other constraints may be formulated in addition to, or instead of, those discussed herein.

The inventors have recognized and appreciated that a stochastic programming formulation with multiple scenarios may be nonconvex, and that a global optimal solution may be desirable. The inventors have further recognized and appreciated that a NGBD method may have a computation time that scales linearly with a number of scenarios, while providing a global optimum. FIG. 7 shows an illustrative process 700 for applying a NGBD method to solve a stochastic programming formulation, in accordance with some embodiments.

In some embodiments, crude oil procurement quantities may be discretized, so that such quantities may be represented using integer variables in Stage I. The inventors have recognized and appreciated that crude oil may be procured in discrete lots, where a unit may be kiloton (kT) or barrel. In some embodiments, barrel may be used as a unit for a crude oil procurement variable, although aspects of the represent disclosure are not so limited, as in some embodiments kT or some other unit may be used.

In some embodiments, a discretization formulation may include the following constraint for each selected crude oil ($d_{C_i}=1$):

$$\underline{z}_{C_i}/\hat{\rho}_{C_i} \leq \tilde{z}_{C_i} Q \leq \bar{z}_{C_i}/\hat{\rho}_{C_i} \quad (5)$$

where:

Q denotes a discretization granularity (e.g., 5000 bbl per lot);

$\tilde{z}_{C_i} \in \mathbb{Z}^+$ represents a number of lots selected; and $\hat{\rho}_{C_i}$ is a density of crude oil with unit kT/bbl.

In some embodiments, the integer variable $\tilde{z}_{C_i} \in \mathbb{Z}^+$ may be replaced by a binary vector $\hat{z}_{C_i} \in \{0,1\}^r$, where $\hat{z}_{C_i,t} \leq d_{C_i}$, $\forall t \in \{1, 2, \ldots, r\}$. The value r may be chosen to be large enough such that any $\tilde{z}_{C_i}$ within the bounds can be represented as $\tilde{z}_{C_i} = \lceil \underline{z}_{C_i}/(\hat{\rho}_{C_i} Q) \rceil d_{C_i} + \Sigma_{t=1}^r 2^{t-1} \hat{z}_{C_i}^t$, $\forall i \in \{1, 2, \ldots, 10\}$, where $\lceil \ \rceil$ denotes the smallest integer great than or equal to an argument. Assuming a total of 10 crude oil candidates, a number of binary variables including $\hat{z}_{C_i}$ and $d_{C_i}$ may be 10×r+10.

The inventors have recognized and appreciated the illustrative problem (P) discussed above may not be convex due to the bilinear terms $b_{jk}^h = x_j^h f_k^h$, and that such nonconvexity may arise in a model that takes into account crude quality uncertainties, product specifications, and processes in a refinery that involve pooling. In some embodiments, the problem (P) may be modified to facilitate the use of a NGBD method to obtain a global optimal solution. For instance, the problem (P) may be modified by introducing an integer variable ž and a binary variable ẑ. Then a convex relaxation may be derived, for example, using McCormick convex and concave envelopes[18] constructed for the terms $x_j^h f_k^h$:

[18] See, e.g., G. P. McCormick, *Computation of global solutions to factorable nonconvex programs: Part I convex underestimating problems*, Mathematical Programming, 10:147, 1976.

$$\min_{x^h, b^h, v^h, f^h, d, \check{z}, \hat{z}} \sum_i Price_{C_i} \check{z}_{C_i} Q + \sum_{h=1}^{H} \frac{a^T x^h}{H}$$

s.t.

$\check{z}_{C_i} Q \leq \bar{z}_{C_i} / \check{\rho}_{C_i}, \forall i \in \{1, 2, \ldots, 10\}$, $F^h(x^h, v^h, f^h, \check{z}, b^h) \leq 0, \forall h \in \{1, 2, \ldots, H\}$, $\check{z}_{C_i} = \left\lceil \frac{z_{C_i}}{\check{\rho}_{C_i} Q} \right\rceil d_{C_i} + \sum_{t=1}^{r} 2^{t-1} \hat{z}_{C_i t}, \forall i \in \{1, 2, \ldots, 10\}$, $(x^h, v^h, f^h) \in \Omega^h, \forall h \in \{1, 2, \ldots, H\}$, $\check{z}_{C_i} \in \mathbb{Z}^+, \hat{z}_{C_i t} \in \{0, 1\}, d_{C_i} \in \{0, 1\}, \forall i \in \{1, 2, \ldots, 10\}$, $\forall t \in \{1, 2, \ldots, r\}$, $\hat{z}_{C_i t} \leq d_{C_i}, \forall i \in \{1, 2, \ldots, 10\}, \forall t \in \{1, 2, \ldots, r\}$, $\underline{x}_j^h \leq x_j^h \leq \bar{x}_j^h, \underline{f}_k^h \leq f_k^h \leq \bar{f}_k^h, \forall (j, k) \in \Gamma$, $\forall h \in \{1, 2, \ldots, H\}$, $x_j^h f_k^h + x_j^h \underline{f}_k^h - \underline{x}_j^h \underline{f}_k^h \leq b_{jk}^h, \forall (j, k) \in \Gamma, \forall h \in \{1, 2, \ldots, H\}$, $\bar{x}_j^h f_k^h + x_j^h \bar{f}_k^h - \bar{x}_j^h \bar{f}_k^h \leq b_{jk}^h, \forall (j, k) \in \Gamma, \forall h \in \{1, 2, \ldots, H\}$, $\bar{x}_j^h f_k^h + x_j^h \underline{f}_k^h - \bar{x}_j^h \underline{f}_k^h \leq b_{jk}^h, \forall (j, k) \in \Gamma, \forall h \in \{1, 2, \ldots, H\}$, $x_j^h f_k^h + x_j^h \bar{f}_k^h - \underline{x}_j^h \bar{f}_k^h \leq b_{jk}^h, \forall (j, k) \in \Gamma, \forall h \in \{1, 2, \ldots, H\}$.

The inventors have recognized and appreciated that a lower bounding problem (LBP) as formulated above may be a mixed integer linear programming (MILP) formulation, and an optimal objective function value for the lower bounding problem (LBP) may be a lower bound of an optimal objective function value for the problem (P) because a feasible region has been enlarged.

In some embodiments, the lower bounding problem (LBP) may be further decomposed based on the convex relaxation described above. For instance, the lower bounding problem (LBP) may be further decomposed by fixing crude oil procurement variables ž, ẑ, d. Each resulting subproblem may be referred to as a primal bounding problem (PBP[h]), corresponding to an hth scenario.

In some embodiments, if all (PBP[h]) are feasible, a valid upper bound of the lower bounding problem (LBP) may be obtained and denoted by $obj_{PBP}(d^{(n)}, \check{z}^{(n)}, \hat{z}^{(n)})$, where the superscript (n) represents an nth iteration, and first-stage decision variable values $(d^{(n)}, \check{z}^{(n)}, \hat{z}^{(n)})$ may recorded. If any subproblem (PBP[h]) is infeasible, a feasibility problem (FP[h]) may be formulated by minimizing a constraint violation of (PBP[h]).

In some embodiments, a cutting plane may be generated using duality, once (PBP[h]) or (FP[h]) are solved for all h. Alternatively, a multi-cut approach may be used to yield a cut for each scenario. One or more of these cutting planes may be added to a relaxed master problem (RMP), which may include crude oil purchase bounds. An illustrative formulation of a relaxed master problem (RMP) is described below.

In some embodiments, one or more Balas cuts[19] may be used, for example, to eliminate integer realizations already visited by an optimization algorithm. The relaxed master problem (RMP) may yield a lower bound on the lower bounding problem (LBP) augmented by Balas cuts.

[19] See, e.g., E. Balas and R. Jeroslow, *Canonical cuts on the unit hypercube*, SIAM Journal of Applied Mathematics, 23:61-69, 1972.

The inventors have recognized and appreciated that, by repeatedly adding cuts, a lower bound may converge to an upper bound of the lower bounding problem (LBP). In some embodiments, once a gap between a lower bound and an upper bound is closed, a primal problem (PP) may be generated, for example, by fixing first-stage decision variables of the problem (P) at the recorded $(d^{(n)}, \check{z}^{(n)}, \hat{z}^{(n)})$, in which $obj_{PBP}(d^{(n)}, \check{z}^{(n)}, \hat{z}^{(n)})$ may be less than the current upper bound of (P).

The inventors have recognized and appreciated that, if the primal problem (PP) is feasible, the solution $obj_{PP}(d^{(n)}, \check{z}^{(n)}, \hat{z}^{(n)})$ is may be a valid upper bound of the problem (P). As more integer values are visited, the $obj_{PP}(d^{(n)}, \check{z}^{(n)}, \hat{z}^{(n)})$ may decrease and the $obj_{RMP}$ may increase. The NGBD algorithm may terminate when an ε-global optimal solution is obtained. In some embodiments, the relative gap may be set as ε=0.1%.

Illustrative formulations of (PBP[h]), (FP[h]), (RMP), and (PP[h]) may be as follows. It should be appreciated that an NGBD framework is presented herein solely for purposes of illustration, as aspects of the present disclosure are not limited to the use of an NGBD method. Moreover, in some embodiments, one or more performance enhancement techniques may be applied to an NGBD method, including, but not limited to, optimality-based interval reduction and/or piecewise convex relaxation.

In some embodiments, a primal bounding problem (PBP[h]) at $(d^{(n)}, \check{z}^{(n)}, \hat{z}^{(n)})$ may be formulated as:

$$\min_{x^h, b^h, v^h, f^h} a^T x^h$$

s.t.

$F^h(x^h, v^h, f^h, \check{z}^{(n)}, b^h) \leq 0$, $(x^h, v^h, f^h) \in \Omega^h$, $\underline{x}_j^h \leq x_j^h \leq \bar{x}_j^h, \underline{f}_k^h \leq f_k^h \leq \bar{f}_k^h, \forall (j, k) \in \Gamma$, $x_j^h f_k^h + x_j^h \underline{f}_k^h - \underline{x}_j^h \underline{f}_k^h \leq b_{jk}^h, \forall (j, k) \in \Gamma$, $\bar{x}_j^h f_k^h + x_j^h \bar{f}_k^h - \bar{x}_j^h \bar{f}_k^h \leq b_{jk}^h, \forall (j, k) \in \Gamma$, $\bar{x}_j^h f_k^h + x_j^h \underline{f}_k^h - \bar{x}_j^h \underline{f}_k^h \leq b_{jk}^h, \forall (j, k) \in \Gamma$, $x_j^h f_k^h + x_j^h \bar{f}_k^h - \underline{x}_j^h \bar{f}_k^h \leq b_{jk}^h, \forall (j, k) \in \Gamma$.

In some embodiments, a feasibility problem (FP[h]) at $(d^{(n)}, \check{z}^{(n)}, \hat{z}^{(n)})$ may be formulated as:

$$\min_{x^h, b^h, v^h, f^h, q^h} \sum_{m=1}^{M} q_m^h$$

-continued s.t.

$F^h(x^h, v^h, f^h, \tilde{z}^{(n)}, b^h)q^h, q^h \geq 0,$ $(x^h, v^h, f^h) \in \Omega^h,$ $\underline{x}_j^h \leq x_j^h \leq \overline{x}_j^h, \underline{f}_k^h \leq f_k^h \leq \overline{f}_k^h, \forall (j, k) \in \Gamma,$ $\underline{x}_j^h f_k^h + x_j^h \underline{f}_k^h - \underline{x}_j^h \underline{f}_k^h \leq b_{jk}^h, \forall (j, k) \in \Gamma,$ $\overline{x}_j^h f_k^h + x_j^h \overline{f}_k^h - \overline{x}_j^h \overline{f}_k^h \leq b_{jk}^h, \forall (j, k) \in \Gamma,$ $\overline{x}_j^h f_k^h + x_j^h \underline{f}_k^h - \overline{x}_j^h \underline{f}_k^h \leq b_{jk}^h, \forall (j, k) \in \Gamma,$ $\underline{x}_j^h f_k^h + x_j^h \overline{f}_k^h - \underline{x}_j^h \overline{f}_k^h \leq b_{jk}^h, \forall (j, k) \in \Gamma,$ where M represents a number of constraints denoted by F, and vector $q^h$ represents one or more violations of constraints.

In some embodiments, a relaxed master problem (RMP) with a multi-cut approach[20] at the (n+1)-th iteration may be formulated as:
[20] See, e.g., Chen, X. Li, T. A. Adams II, and P. I. Barton, *Decomposition strategy for the global optimization of flexible energy polygeneration systems*, AIChE Journal, 58:3080-3095, 2012.

$$\min_{d, \tilde{z}, \hat{z}} \sum_i Price_{C_i} \tilde{z}_{C_i} Q + \sum_{h=1}^{H} \frac{\eta^h}{H}$$

s.t.

$\tilde{z}_{C_i} Q \leq z_{C_i} / \tilde{\rho}_{C_i}, \forall i \in \{1, 2, \ldots, 10\},$ $\tilde{z}_{C_i} = \lceil z_{C_i} / (\tilde{\rho}_{C_i} Q) \rceil d_{C_i} + \sum_{t=1}^{r} 2^{t-1} \hat{z}_{C_i t}, \forall i \in \{1, 2, \ldots, 10\},$ $\tilde{z}_{C_i} \in \mathbb{Z}^+, \hat{z}_{C_i t} \in \{0, 1\}, d_{C_i} \in \{0, 1\}, \forall i \in \{1, 2, \ldots, 10\},$ $\forall t \in \{1, 2, \ldots, r\},$ $\hat{z}_{C_i t} \leq d_{C_i}, \forall i \in \{1, \ldots, 10\}, \forall t \in \{1, 2, \ldots, r\},$ $\eta^h \geq a^T x^{h,p} + (\lambda^{h,p})^T F^h(x^{h,p}, v^{h,p}, f^{h,p}, \tilde{z}, b^{h,p}), \forall p \in T^n,$ $\forall h \in \{1, 2, \ldots, H\},$ $0 \geq (\mu^{h,s})^T F^h(x^{h,s}, v^{h,s}, f^{h,s}, \tilde{z}, b^{h,s}), \forall s \in G^n,$ $\forall h \in \{1, 2, \ldots, H\},$ $$\sum_{j \in \{i: d_{C_i}^{(m)} = 1\}} d_{C_j} + \sum_{\{j, q\} \in \{i, t: \hat{z}_{C_i t}^{(m)} = 1\}} \hat{z}_{C_j q} -$$

$$\sum_{j \in \{i: d_{C_i}^{(m)} = 0\}} d_{C_j} - \sum_{\{j, q\} \in \{i, t: \hat{z}_{C_i t}^{(m)} = 0\}} \hat{z}_{C_j q} \leq$$

$|\{\{i, t\}: \hat{z}_{C_i t}^{(m)} = 1\}| + |\{i: d_{C_i}^{(m)} = 1\}| - 1, \forall m \in \{1, 2, \ldots, n\},$ where the index sets are:

$T^n = \{p \in \{1, 2, \ldots, n\}: \text{All}(\text{PBP}^h(d^{(p)}, \tilde{z}^{(p)}, \hat{z}^{(p)})) \text{ are feasible for } h=1, 2, \ldots, H\},$ $G^n = \{s \in \{1, 2, \ldots, n\}: \text{At least one}(\text{PBP}^h(d^{(s)}, \tilde{z}^{(s)}, \hat{z}^{(s)})) \text{ is infeasible}\},$ In this example, $(x^{h,p}, v^{h,p}, f^{h,p}, b^{h,p})$ may be an optimal solution of the primal) bounding problem (PBP$^h$), at $(d^{(p)}, \tilde{z}^{(p)}, \hat{z}^{(p)})$, with Lagrange multipliers $\lambda^{h,p}$, which may form an optimality cut, whereas $(x^{h,s}, v^{h,s}, f^{h,s}, b^{h,s}, q^{h,s})$ may be an optimal solution of the feasibility problem (FP$^h$), at $(d^{(s)}, \tilde{z}^{(s)}, \hat{z}^{(s)})$ with Lagrange multipliers $\mu^{h,s}$, which may form a feasibility cut. The last constraint in the relaxed master problem (RMP) may be a Balas cut, which may prevent the NGBD algorithm from revisiting previous integer realizations of (d, $\hat{z}$). The corresponding z may be skipped by the NGBD algorithm, because z may be linked by the equality constraint: $\tilde{z}_{C_i} = \lceil z_{C_i} / (\tilde{\rho}_{C_i} Q) \rceil d_{C_i} + \sum_{t=1}^{r} 2^{t-1} \hat{z}_{C_i t}, \forall i \in \{1, 2, \ldots, 10\}.$ In some embodiments, a primal problem (PP$^h$) at $(d^{(n)}, \tilde{z}^{(n)}, \hat{z}^{(n)})$ may be formulated as:

$$obj_{PP^h}(d^{(n)}, \tilde{z}^{(n)}, \hat{z}^{(n)}) = \min_{x^h, b^h, v^h, f^h} a^T x^h (PP^h)$$

s.t.

$F^h(x^h, v^h, f^h, \tilde{z}^{(n)}, b^h) \leq 0,$ $b_{jk}^h = x_j^h f_k^h, \forall (j, k) \in \Gamma,$ $\underline{x}_j^h \leq x_j^h \leq \overline{x}_j^h, \underline{f}_k^h \leq f_k^h \leq \overline{f}_k^h, \forall (j, k) \in \Gamma,$ $(x^h, v^h, f^h) \in \Omega^h.$ In some embodiments, an objective value of the primal problem (PP) at $(d^{(n)}, \tilde{z}^{(n)}, \hat{z}^{(n)})$ may be $$\sum_{i=1}^{10} Price_{C_i} \tilde{z}_{C_i}^{(n)} Q + \sum_{h=1}^{H} \frac{obj_{PP^h}(d^{(n)}, \tilde{z}^{(n)}, \hat{z}^{(n)})}{H}.$$

Figure 8:
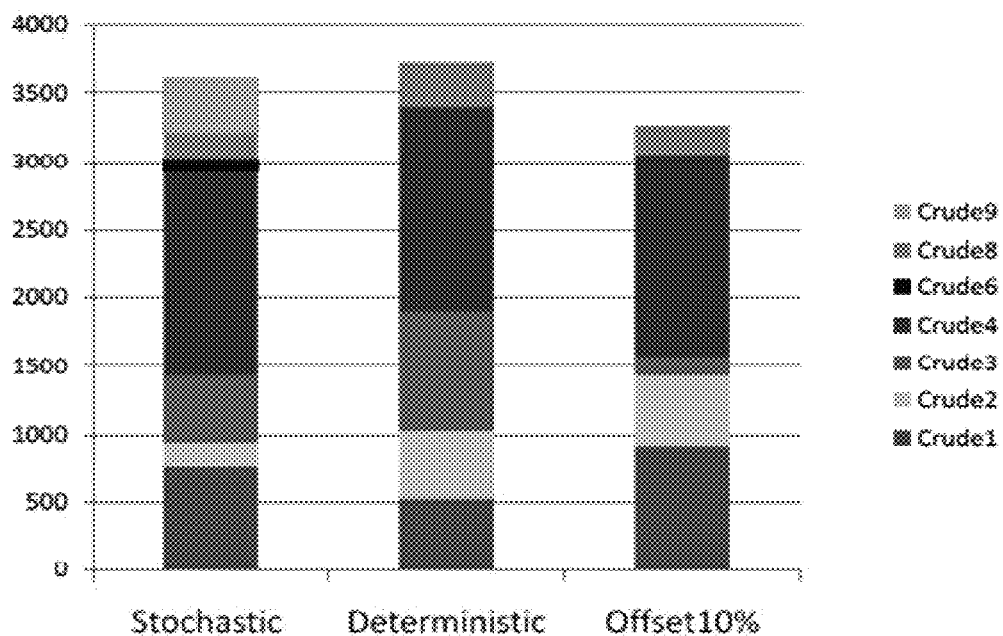
FIG. 8 shows illustrative procurement decisions resulting from a stochastic method, a deterministic method, and a 10% offset method in Example 1.

FIG. 8 shows illustrative procurement decisions resulting from three different methods, stochastic, deterministic, and 10% offset, in Example 1. The stacked column on the left shows a procurement decision made by using probability distributions to represent uncertainties and then solving a stochastic programming problem. The stacked column in the middle shows a procurement decision made by solving a deterministic problem based on nominal parameter values. The stacked column on the right shows a procurement decision made by tightening product specifications by 10%. The unit of procurement used in Example 1 is $10^3$ bbl/month.

The illustrative procurement amounts shown in FIG. 8 are listed in Table 10 below. Nominal crude yields and Stage II realized crude yields used in Example 1 are shown in Tables 11-12 below, respectively. Sulfur fractions used in Example 1 are shown in Table 13 below.

TABLE 10

| Crude procurement decisions (in kT). | | | | | | | | | | |
|---|---|---|---|---|---|---|---|---|---|---|
|  | $C_1$ | $C_2$ | $C_3$ | $C_4$ | $C_5$ | $C_6$ | $C_7$ | $C_8$ | $C_9$ | $C_{10}$ |
| Deterministic | 70.45 | 70.83 | 117.42 | 199.58 | 0 | 0 | 0 | 45.88 | 0 | 0 |
| Offset | 122.79 | 72.95 | 17.45 | 198.91 | 0 | 0 | 0 | 28.50 | 0 | 0 |
| Stochastic | 101.32 | 26.21 | 65.09 | 199.58 | 0 | 14.81 | 0 | 25.72 | 52.46 | 0 |

TABLE 11

Nominal crude yields.

| Crude | RG | LG | LN | HN | KE | GO | VGO | VR |
|---|---|---|---|---|---|---|---|---|
| $Crude_1$ | 0.002 | 0.0091 | 0.0698 | 0.1598 | 0.1003 | 0.2876 | 0.2682 | 0.1032 |
| $Crude_2$ | 0.002 | 0.0089 | 0.048 | 0.0959 | 0.0796 | 0.2249 | 0.2735 | 0.2672 |
| $Crude_3$ | 0.002 | 0.0080 | 0.061 | 0.1206 | 0.0861 | 0.2414 | 0.2646 | 0.2163 |
| $Crude_4$ | 0.004 | 0.020 | 0.0851 | 0.1532 | 0.0947 | 0.2539 | 0.2535 | 0.1356 |
| $Crude_5$ | 0.002 | 0.0115 | 0.0543 | 0.1026 | 0.0765 | 0.2286 | 0.2695 | 0.2550 |
| $Crude_6$ | 0.001 | 0.0064 | 0.0246 | 0.0607 | 0.0518 | 0.1900 | 0.2932 | 0.3723 |
| $Crude_7$ | 0.002 | 0.0155 | 0.0945 | 0.1661 | 0.1160 | 0.2656 | 0.2317 | 0.1086 |
| $Crude_8$ | 0.0029 | 0.013 | 0.0652 | 0.1196 | 0.0838 | 0.2127 | 0.2408 | 0.2620 |
| $Crude_9$ | 0.004 | 0.0157 | 0.0749 | 0.1267 | 0.0915 | 0.2353 | 0.2510 | 0.2009 |
| $Crude_{10}$ | 0.004 | 0.0107 | 0.0604 | 0.1123 | 0.0784 | 0.2092 | 0.2491 | 0.2759 |

TABLE 12

Stage II realized crude yields.

| Crude | RG | LG | LN | HN | KE | GO | VGO | VR |
|---|---|---|---|---|---|---|---|---|
| $Crude_1$ | 0.0020 | 0.0091 | 0.0698 | 0.1599 | 0.1003 | 0.2877 | 0.2683 | 0.1028 |
| $Crude_2$ | 0.0021 | 0.0092 | 0.0494 | 0.0987 | 0.0819 | 0.2314 | 0.2815 | 0.2459 |
| $Crude_3$ | 0.0019 | 0.0078 | 0.0593 | 0.1172 | 0.0873 | 0.2346 | 0.2572 | 0.2383 |
| $Crude_4$ | 0.0040 | 0.0200 | 0.0853 | 0.1535 | 0.0949 | 0.2544 | 0.2540 | 0.1338 |
| $Crude_5$ | 0.0020 | 0.0118 | 0.0556 | 0.1051 | 0.0784 | 0.2342 | 0.2761 | 0.2368 |
| $Crude_6$ | 0.0009 | 0.0059 | 0.0226 | 0.0558 | 0.0476 | 0.1748 | 0.2697 | 0.4226 |
| $Crude_7$ | 0.0020 | 0.0155 | 0.0948 | 0.1666 | 0.1163 | 0.2663 | 0.2323 | 0.1062 |
| $Crude_8$ | 0.0030 | 0.0133 | 0.0666 | 0.1221 | 0.0856 | 0.2171 | 0.2458 | 0.2466 |
| $Crude_9$ | 0.0040 | 0.0158 | 0.0755 | 0.1276 | 0.0922 | 0.2370 | 0.2529 | 0.1950 |
| $Crude_{10}$ | 0.0041 | 0.0110 | 0.0624 | 0.1159 | 0.0809 | 0.2160 | 0.2571 | 0.2525 |

TABLE 13

Sulfur fractions.

| | $C_1$ | $C_2$ | $C_3$ | $C_4$ | $C_5$ | $C_6$ | $C_7$ | $C_8$ | $C_9$ | $C_{10}$ |
|---|---|---|---|---|---|---|---|---|---|---|
| Nominal | 0.1570 | 0.293 | 0.162 | 0.2000 | 0.2630 | 0.6940 | 0.7670 | 1.5500 | 0.3260 | 1.0900 |
| Real | 0.1394 | 0.3670 | 0.1888 | 0.2062 | 0.2299 | 0.6339 | 0.7535 | 1.6727 | 0.2826 | 0.8360 |

In Example 1, the deterministic optimization method is more aggressive and buys more Crude 8, which has the largest sulfur fraction. The offset method tightens the sulfur specification by 10% and assumes that only 90% of the desulfurization unit capacity can be used, thereby obtaining a more conservative solution. The stochastic programming method takes into account all scenarios explicitly, and the resulting solution is neither too aggressive nor too conservative.

The inventors have recognized and appreciated that, due to uncertainties in sulfur fractions and capacity limitation for a desulfurization unit at a refinery, some optimization methods may not be able to produce diesel with no more than 15 ppm sulfur. As a result, high quality diesel (e.g., no more than 10 ppm sulfur) may be imported and blended with diesel produced by the refinery to produce a final product with reduced sulfur fraction. Such mitigation processing may involve significant expense. In Example 1, procurement costs for the deterministic and offset methods depend on importation price of high quality diesel, because both methods lead to violation of the sulfur specification in some cases.

Figure 9:
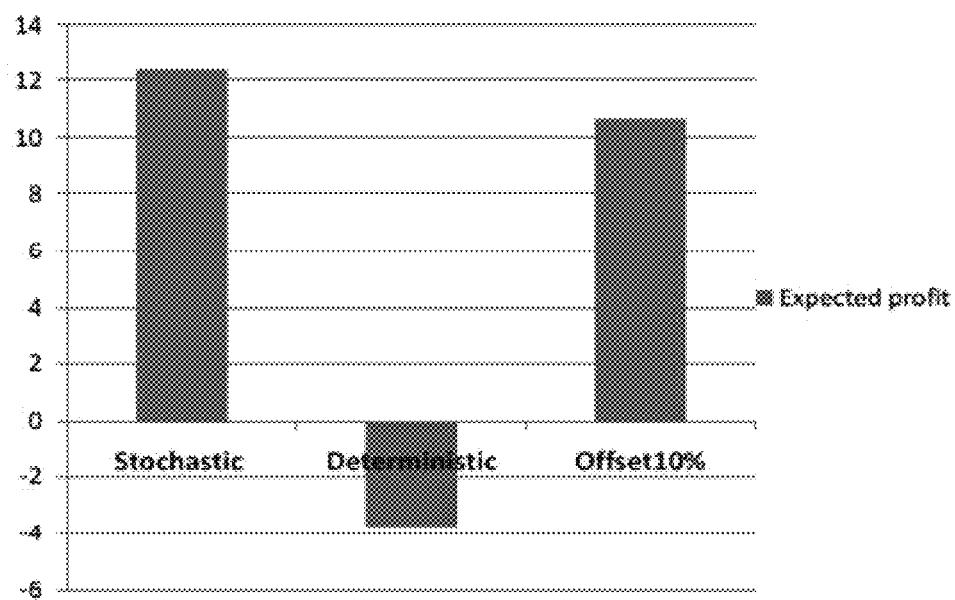
FIG. 9 shows illustrative expected profits resulting from the stochastic, deterministic, and offset methods in Example 1.

FIG. 9 shows illustrative expected profits resulting from the stochastic, deterministic, and offset methods in Example 1. The deterministic method (loss of $3.78 M/month) has the worst performance because 10 ppm diesel must be imported in a large number of scenarios. The offset method (profit of $10.68 M/month) leads to importation in fewer number of scenarios. The stochastic programming method (profit of $12.38 M/month) has the best performance because quality specifications are guaranteed to be satisfied in all scenarios, and importation is not necessary.

In Example 1, one scenario is selected from the scenarios generated at Stage I, and refinery operations are optimized at Stage II based on the selected scenario. Because the three methods lead to different procurement decisions at Stage I, Stage II results for these methods are also different. Variable values for the three solutions in Example I are shown in Tables 14-16 below.

TABLE 14

Variable values (x unit: kT) in Example 1 - Part I.

| Variables | Deterministic | offset | Stochastic |
|---|---|---|---|
| $x_{R,HN,Sev95}$ | 5.000 | 5.000 | 5.000 |
| $x_{R,HN,Sev100}$ | 50.965 | 54.926 | 50.500 |
| $x_{Cr,VCO,Mogan}$ | 131.012 | 115.497 | 125.576 |
| $x_{Cr,VCO,ACO}$ | 0 | 0 | 0 |
| $x_{LLN}$ | 18.455 | 17.551 | 19.195 |
| $x_{Des,GO1}$ | 20.270 | 35.327 | 20.140 |
| $x_{Des,GO2}$ | 16.389 | 16.881 | 6.064 |
| $x_{Des,GO3}$ | 27.547 | 4.093 | 15.269 |
| $x_{Des,GO4}$ | 58.778 | 50.694 | 38.773 |
| $x_{Des,GO5}$ | 0 | 0 | 0 |

TABLE 14-continued

Variable values (x unit: kT) in Example 1 - Part I.

| Variables | Deterministic | offset | Stochastic |
|---|---|---|---|
| $x_{Des,GO6}$ | 0 | 0 | 2.580 |
| $x_{Des,GO7}$ | 0 | 0 | 0 |
| $x_{Des,GO8}$ | 9.961 | 0.188 | 5.584 |
| $x_{Des,GO9}$ | 0 | 0 | 12.432 |
| $x_{Des,GO10}$ | 0 | 0 | 0 |
| $x_{Des,CGO}$ | 0 | 0.77 | 1.408 |
| $x_{PG98,LN}$ | 0 | 0 | 0 |
| $x_{PG98,LG}$ | 0.186 | 0.186 | 0.186 |
| $x_{PG98,ISO}$ | 0 | 0 | 0 |
| $x_{PG98,R9K}$ | 1.635 | 1.636 | 1.636 |
| $x_{PG98,R100}$ | 3.179 | 3.178 | 3.178 |
| $x_{PG98,CN}$ | 0 | 0 | 0 |
| $x_{PG98,LN}$ | 0 | 0 | 0 |
| $x_{PG98,LG}$ | 4.933 | 4.405 | 4.855 |
| $x_{PG98,ISO}$ | 17.981 | 17.024 | 18.610 |
| $x_{PG98,R95}$ | 2.515 | 2.514 | 2.514 |
| $x_{PG98,100}$ | 44.194 | 48.214 | 43.828 |
| $x_{PG98,CN}$ | 57.121 | 50.357 | 54.751 |

TABLE 15

Variable values (x unit: kT) in Example 1 - Part II.

| Variables | Deterministic | offset | Stochastic |
|---|---|---|---|
| $x_{DIESEL,GO2-3}$ | 0 | 0 | 0 |
| $x_{DIESEL,DESGO1}$ | 19.864 | 34.620 | 28.560 |
| $x_{DIESEL,DESGO2}$ | 16.862 | 16.543 | 5.943 |
| $x_{DIESEL,DESGO3}$ | 26.996 | 4.011 | 14.964 |
| $x_{DIESEL,DESGO4}$ | 49.757 | 49.592 | 49.757 |
| $x_{DIESEL,DESGO5}$ | 0 | 0 | 0 |
| $x_{DIESEL,DESGO6}$ | 0 | 0 | 2.511 |
| $x_{DIESEL,DESGO7}$ | 0 | 0 | 0 |
| $x_{DIESEL,DESGO8}$ | 9.562 | 5.940 | 5.361 |
| $x_{DIESEL,DESGO9}$ | 0 | 0 | 12.183 |
| $x_{DIESEL,DESGO10}$ | 0 | 0 | 0 |
| $x_{DIESEL,CGO}$ | 0 | 0 | 0 |
| $x_{DIESEL,KE}$ | 0 | 0 | 0 |
| $x_{DIESEL,DESCGO}$ | 0 | 0.730 | 1.344 |
| $x_{HF,VR1}$ | 7.243 | 12.623 | 10.416 |
| $x_{HF,VR2}$ | 17.416 | 17.939 | 6.444 |
| $x_{HF,VR3}$ | 27.982 | 4.157 | 15.510 |
| $x_{HF,VR4}$ | 26.704 | 26.615 | 56.704 |
| $x_{HF,VR5}$ | 0 | 0 | 0 |
| $x_{HF,VR6}$ | 0 | 0 | 6.258 |
| $x_{HF,VR7}$ | 0 | 0 | 0 |
| $x_{HF,VR8}$ | 11.314 | 7.028 | 6.343 |
| $x_{HF,VR9}$ | 0 | 0 | 10.229 |
| $x_{HF,VR10}$ | 0 | 0 | 0 |
| $x_{HF,CGO}$ | 58.431 | 58.742 | 54.607 |
| $x_{HF,3F,F1}$ | 0 | 0 | 0 |
| $x_{HF,3F,F2}$ | 50.625 | 45.630 | 40.377 |

TABLE 16

Variable values (x unit: kT) in Example 1 - Part III.

| Variables | Deterministic | offset | Stochastic |
|---|---|---|---|
| $x_{RF,LG}$ | 11.508 | 0 | 11.387 |
| $x_{RF,LN}$ | 0 | 11.425 | 0 |
| $x_{RF,RG}$ | 12.462 | 11.332 | 12.325 |
| $x_{DIESEL,Import}$ | 33.426 | 0 | 0 |
| $x_{ES95,Export}$ | 126.663 | 114.574 | 124.568 |
| $x_{PG98,Export}$ | 5 | 5 | 5 |
| $x_{Jet,Export}$ | 50.625 | 45.630 | 49.377 |
| $x_{DIESEL,Export}$ | 155.667 | 111.445 | 120.629 |
| $x_{HF,Export}$ | 149.090 | 119.104 | 136.51 |
| $x_{LG,Export}$ | 4.713 | 3.368 | 4.738 |
| $x_{LN,Export}$ | 15.233 | 12.927 | 14.335 |
| $v_{ES95}$ | 170.003 | 153.07 | 167.422 |

TABLE 16-continued

Variable values (x unit: kT) in Example 1 - Part III.

| Variables | Deterministic | offset | Stochastic |
|---|---|---|---|
| $v_{PG98}$ | 6.418 | 6.418 | 6.418 |
| $v_{HF}$ | 156.762 | 125.189 | 143.608 |
| $x_{Pro,LG}$ | 4.713 | 3.368 | 4.738 |
| $x_{Pro,LN}$ | 15.233 | 12.927 | 14.335 |
| $f_{D,LG}$ | 0.318 | 0.323 | 0.327 |
| $f_{R,LG,Sev95}$ | 0.021 | 0.023 | 0.021 |
| $f_{R,LG,Sev100}$ | 0.336 | 0.339 | 0.337 |
| $f_{Cr,LG,Mogas}$ | 0.325 | 0.315 | 0.314 |
| $f_{Cr,LG,AGO}$ | 0 | 0 | 0 |
| $f_{Cr,CGO,Mogas}$ | 1 | 1 | 1 |
| $f_{Cr,CGO,AGO}$ | 0 | 0 | 0 |

Figure 11:
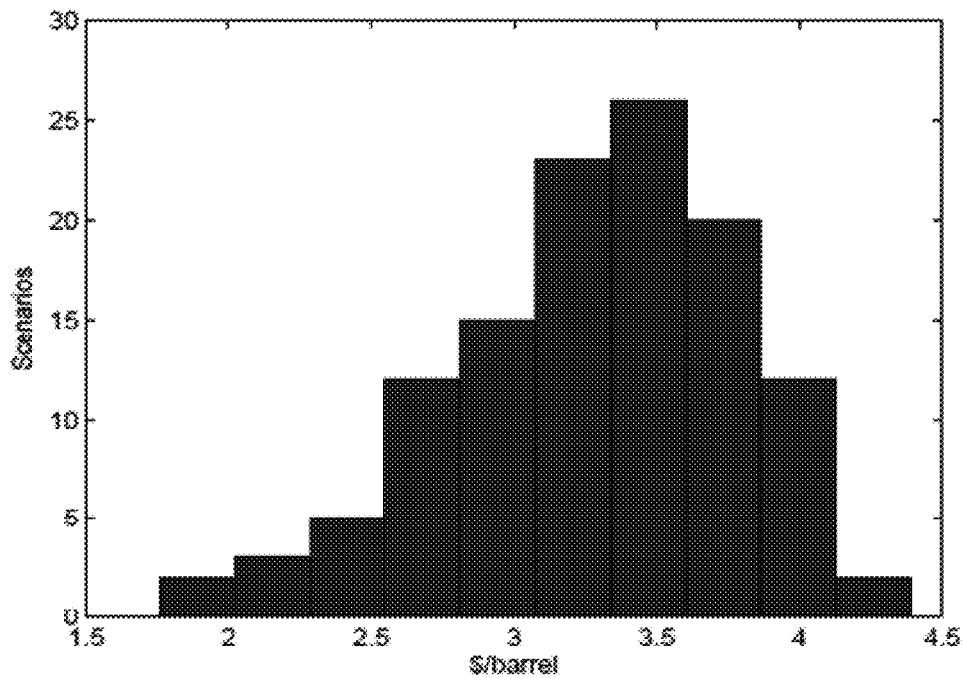
Figure 12:
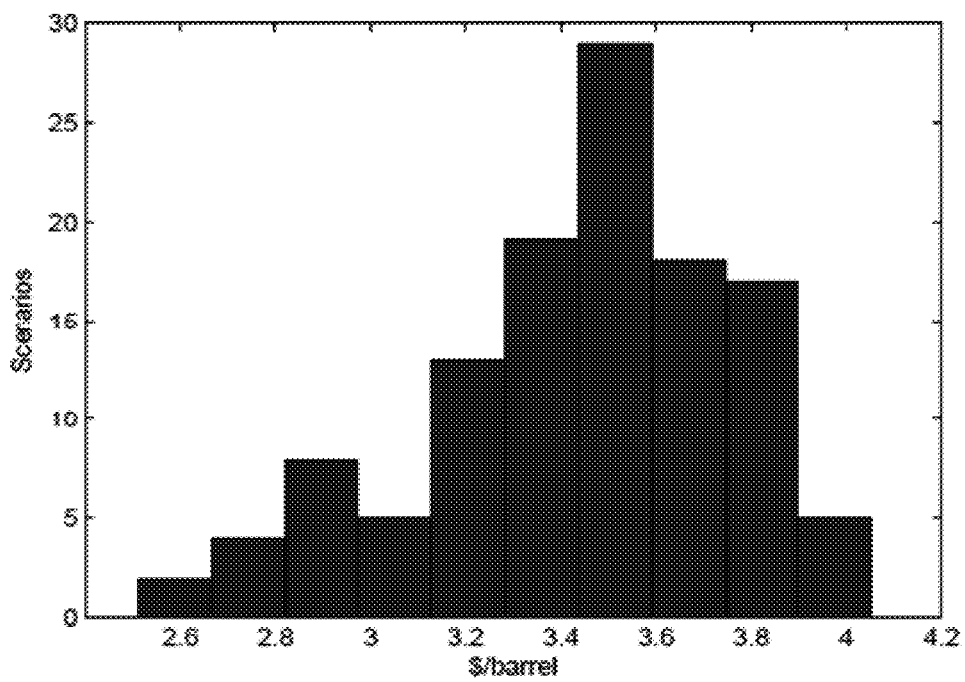
Figure 13:
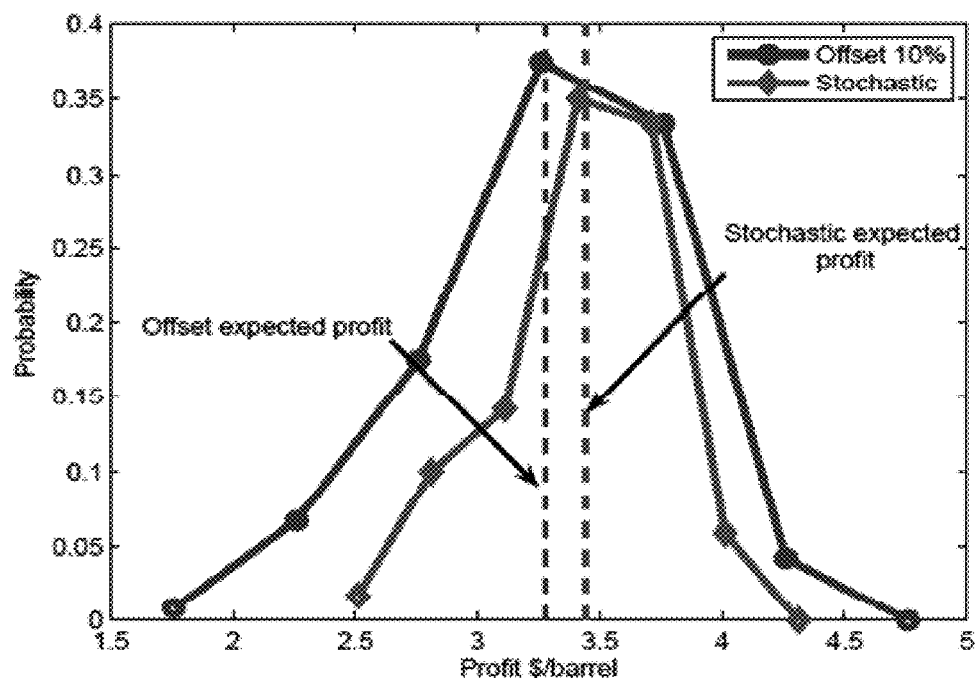
FIG. 13 shows illustrative profit distributions for the stochastic and offset methods in Example 1.

FIGS. 10-12 show, respectively, illustrative profit histograms for the deterministic, offset, and stochastic methods in Example 1. FIG. 13 shows illustrative profit distributions for the stochastic and offset methods in Example 1, where the sample space for both distributions includes the scenarios generated at Stage I. The stochastic method has an expected profit of $3.443/barrel, outperforming the offset method, which has an expected profit of $3.277/barrel.

In Example 1, refinery operations are optimized for the constant crude procurement decision made by the deterministic method, and likewise for the offset method. In this example, the stochastic method avoids most of the low profitability outcomes resulting from the deterministic method, and is less conservative than the 10% offset method.

The following illustrative price relationship between 10 ppm sulfur diesel and 15 ppm sulfur diesel is used in Example 1:

Price 10 ppm=θ·Price 15 ppm, where θ=1.1.

Figure 14:
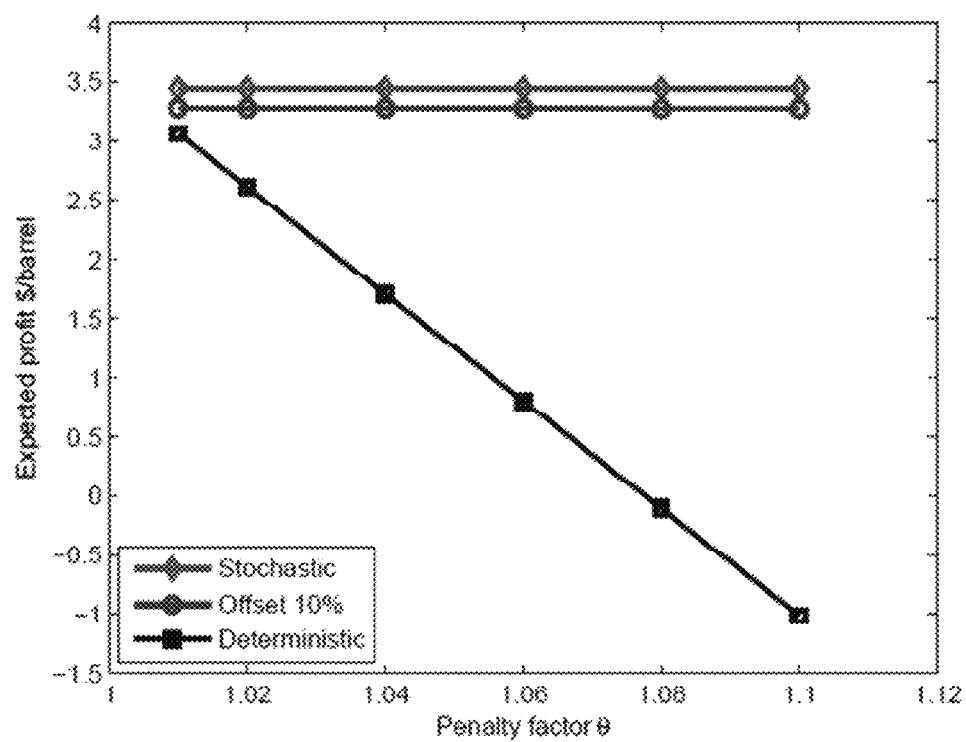
FIG. 14 shows illustrative variations of average profit per barrel with respect to a parameter 0, in accordance with some embodiments.

In some embodiments, the parameter θ may be specified either according to real importation price, or as a weight to penalize constraint violation. FIG. 14 shows variations of average profit per barrel with respect to θ, in accordance with some embodiments. In this example, the difference between the stochastic and offset methods is nearly constant, at 16.6 cents/barrel, which represents, approximately, a 5% improvement. Moreover, in this example, even if θ=1.01, the stochastic programming method is still better than the deterministic method.

Figure 2B:
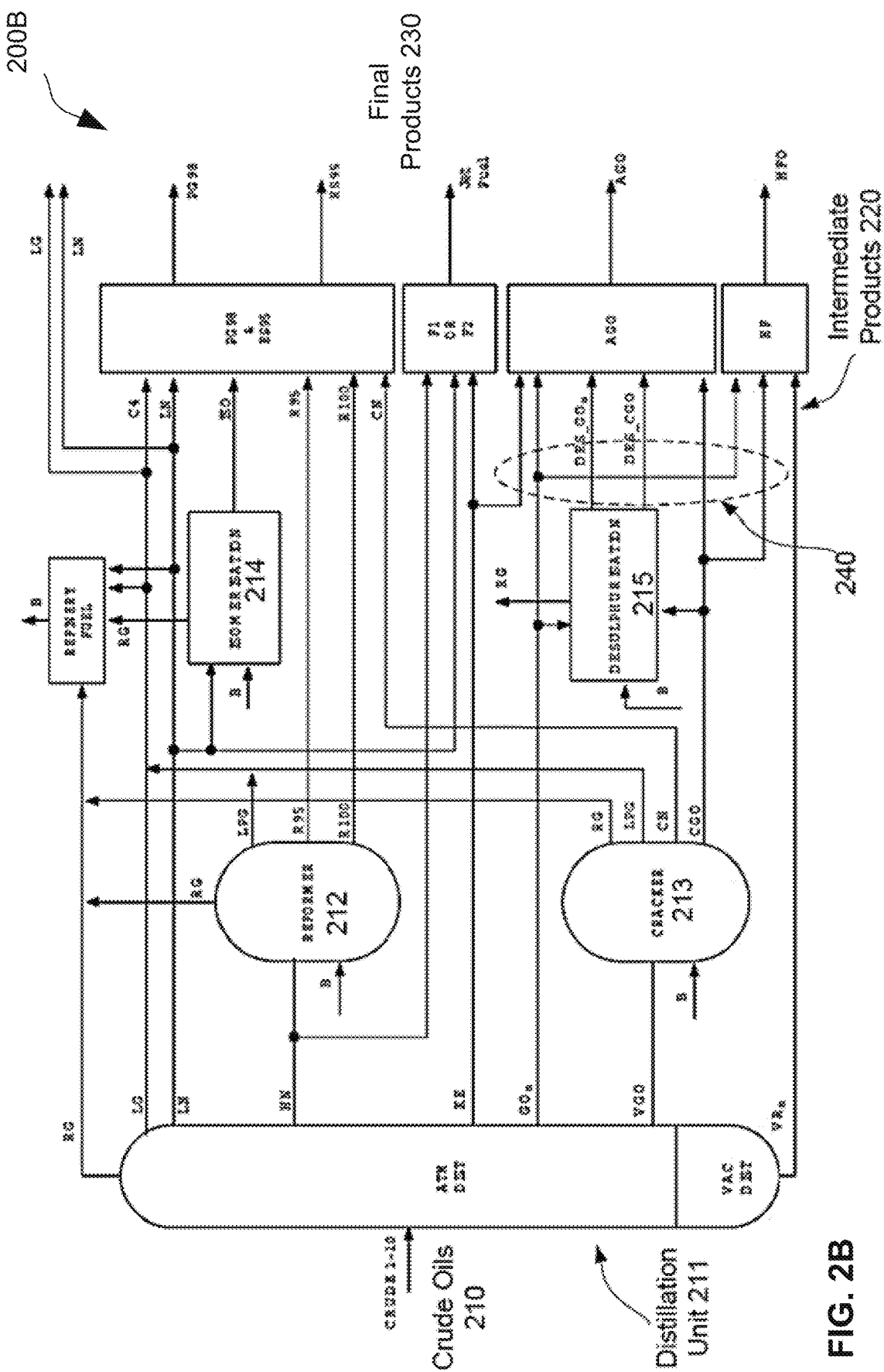
FIG. 2B shows another illustrative oil refinery flow chart 200B, in accordance with some embodiments.

FIG. 2B shows an illustrative oil refinery flow chart 200B, in accordance with some embodiments. For instance, the flow chart 200B may be a schematic representation of the processing performed by the illustrative oil refinery system 100 shown in the example of FIG. 1.

The illustrative flowchart 200B may be the same as the illustrative flowchart 200A shown in FIG. 2A, except that high sulfur gas oil (GO) may feed to an HF (heavy fuel oil) tank as well as a diesel tank, as shown at 240 in FIG. 2B. This design avoids production of an off-spec product (e.g., diesel with more than 15 ppm sulfur) by allowing production of a low value product (e.g., HF), which may not be subject to a strict sulfur specification, in the event of extra sulfur due to VR yield and GO sulfur fraction variations.

Figure 15:
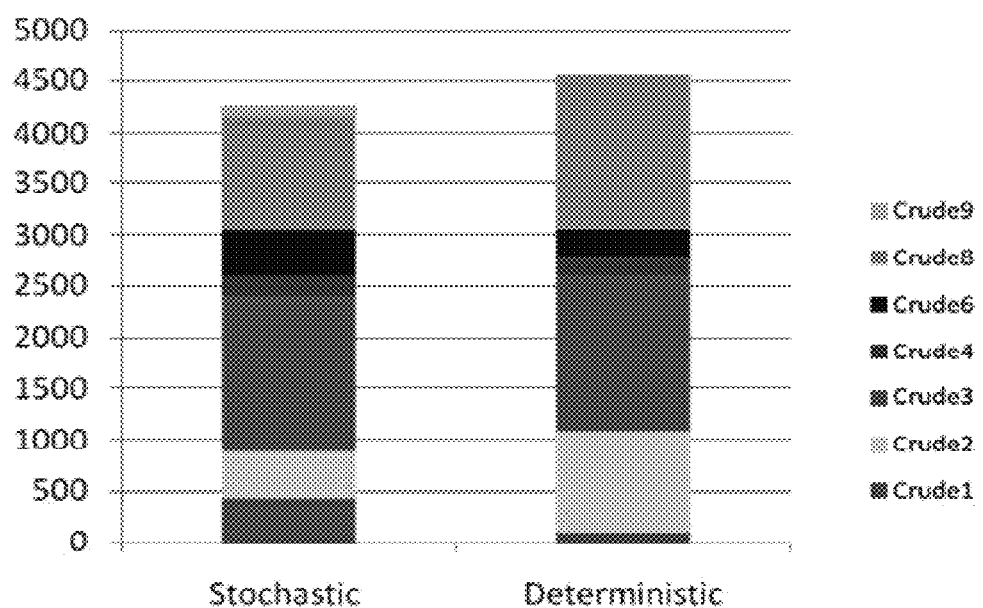
FIG. 15 shows illustrative procurement decisions resulting from a stochastic method and a deterministic method in Example 2.

FIG. 15 shows illustrative procurement decisions resulting from two different methods, stochastic and deterministic, in Example 2, which is based on the illustrative flowchart 200B shown in FIG. 2B. In this example, no importation of high quality diesel is allowed.

Figure 16:
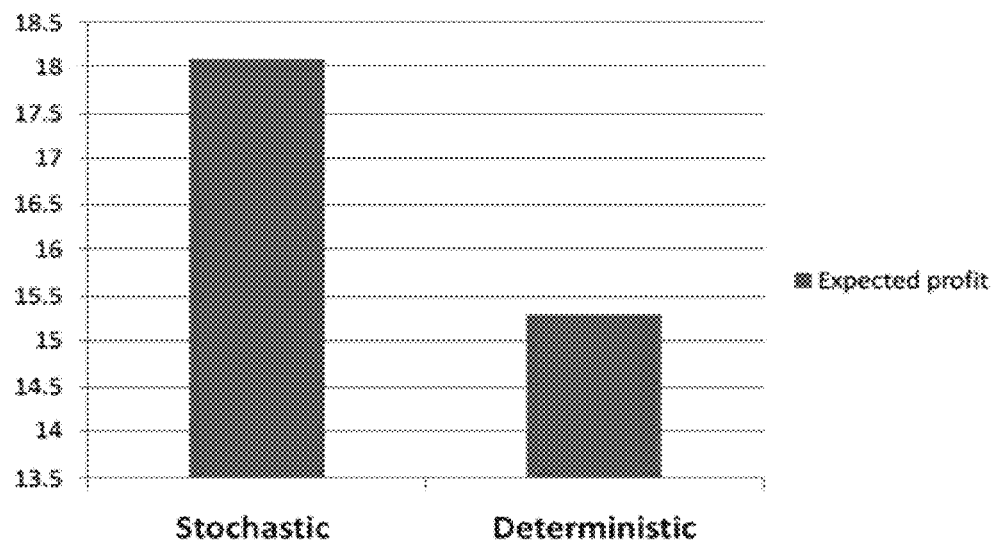
FIG. 16 shows illustrative expected profits resulting from the stochastic and deterministic methods in Example 2.
Figure 17:
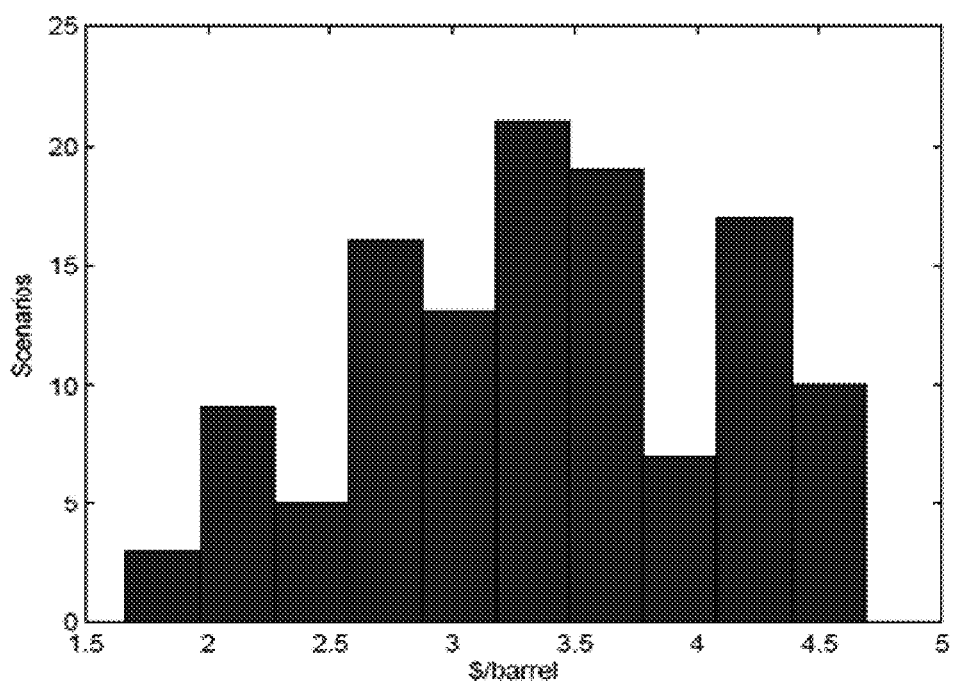
FIGS. 17-18 show, respectively, illustrative profit histograms for the deterministic and stochastic methods in Example 2.
Figure 18:
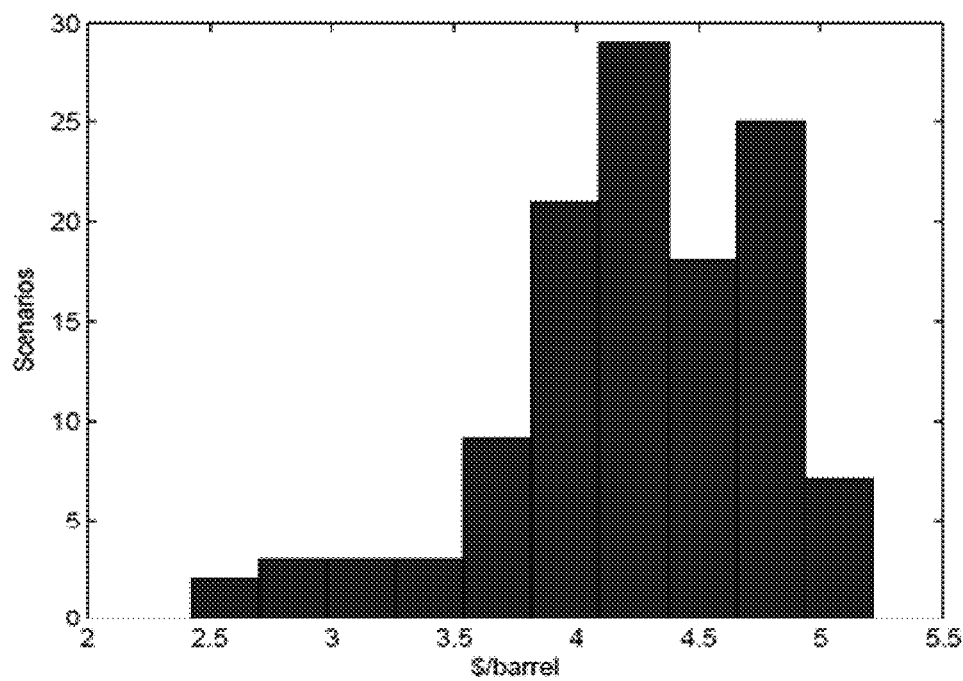
Figure 19:
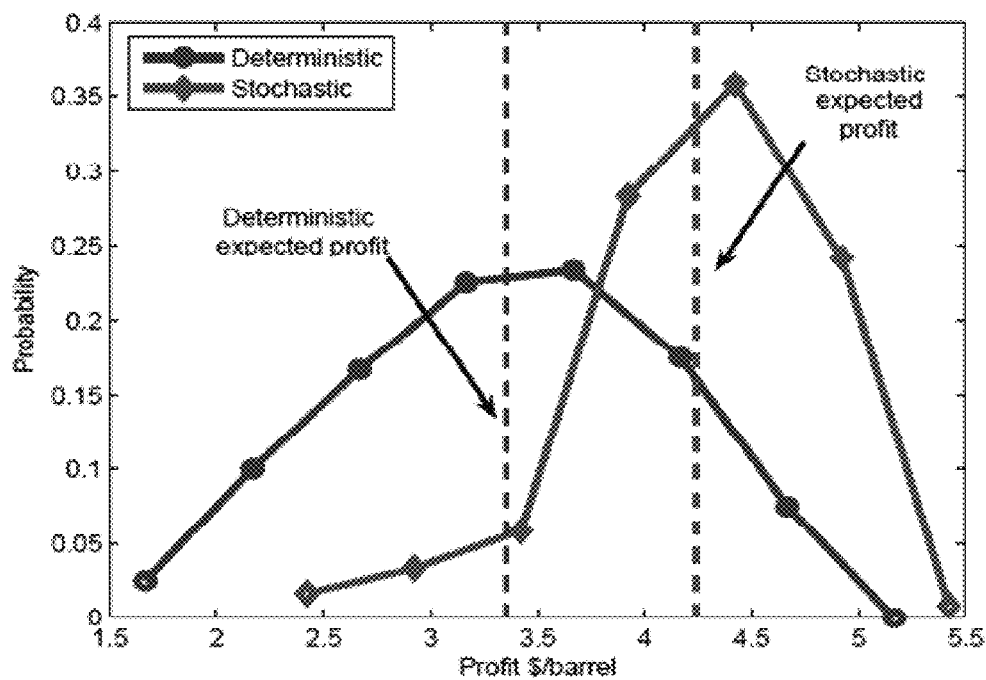
FIG. 19 shows illustrative profit distributions for the stochastic and deterministic methods in Example 2.

FIG. 16 shows illustrative expected profits resulting from the stochastic and deterministic methods in Example 2. FIGS. 17-18 show, respectively, profit histograms for the deterministic and stochastic methods in Example 2. FIG. 19 shows illustrative profit distributions for the stochastic and deterministic methods in Example 2. The stochastic method has an expected profit of $4.239/barrel, outperforming the offset method, which has an expected profit of $3.355/barrel.

Even though the stochastic method only earns $1 M more per month than the deterministic method, the total procurement amount made under the stochastic method is smaller. Therefore, in Example 2, the stochastic method provides improved profitability per barrel over the deterministic method. On average, in Example 2, the stochastic method provides 56 cents per barrel more in profit than the deterministic method. This example illustrates that even for a well-designed refinery without quality specification violations in the presence of uncertainties, the stochastic method may still outperform the deterministic method.

The inventors have recognized and appreciated that optimal blending of intermediates into final products may be important for the profitability of refinery operations. In some embodiments, a chance-constrained programming[21] formulation may be used to model uncertainties in feedstock qualities and to provide a robust blending plan to ensure all quality specifications are jointly met with a probability greater than a specified threshold.

[21] See, e.g., A. Pr'ekoba, *Stochastic programming*, Kluwer Academic Publishers, Netherlands, 1995.

Figure 20:
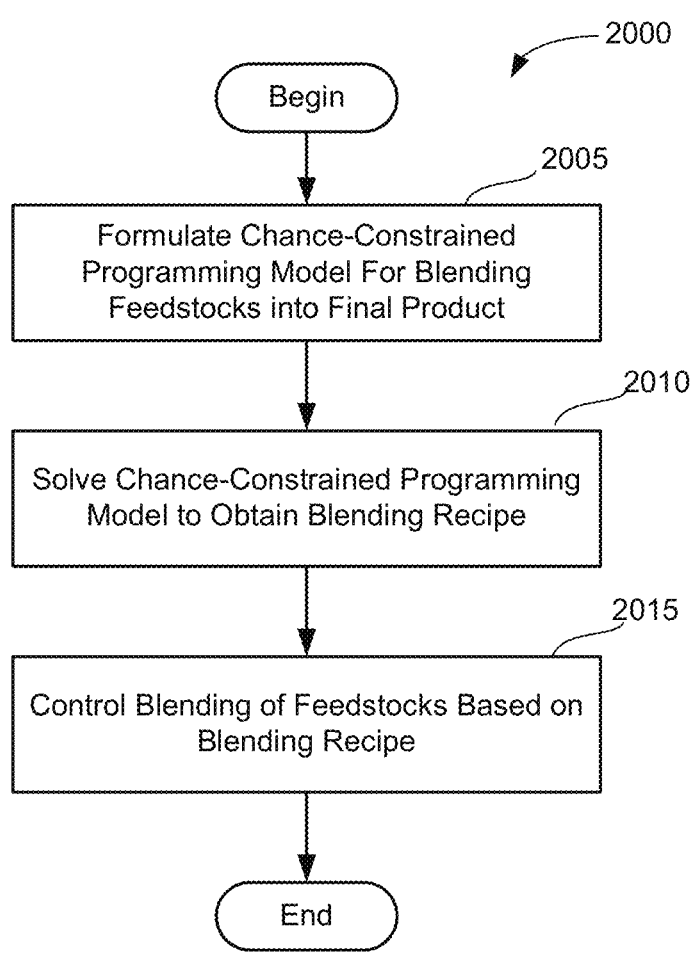
FIG. 20 shows an illustrative process 2000 that may be performed by an oil refinery system to choose a blending plan, in accordance with some embodiments.

FIG. 20 shows an illustrative process 2000 that may be performed by an oil refinery system to choose a blending plan, in accordance with some embodiments. For instance, the process 2000 may be performed by the illustrative oil refinery system 100 shown in the example of FIG. 1.

At act 2005 of the illustrative process 2000, a chance-constrained programming model may be formulated, for instance, based on probability distributions for qualities of feedstocks. Examples of feedstock qualities that may be uncertain include, but are not limited to, Reid Vapor Pressure (RVP), Research Octane Number (RON), Motor Octane Number (MON), sulfur, benzene, etc. Any suitable probability distribution may be used to model such an uncertain parameter, including, but not limited to, a Gaussian distribution with known mean and standard deviation. However, it should be appreciated that aspects of the present disclosure are not so limited, as other probability distributions may also be suitable.

In some embodiments, a linear objective function may be used to represent cost of feedstocks and revenue from selling a final product. In a final step of a blending process with linear mixing rules, qualities of the final product may also be a linear function of inflows. For example, in some embodiments, the following linear programming (LP) formulation may solve a profit maximization problem for a final product subject to quality constraints:

$$\max_{x \in X} g^T x$$

s.t.

$$\beta_l^T x \le y_l e^T x, \forall l \in \Xi,$$

where:
g$^T$x is a profit of this product;
x∈ $\mathbb{R}_+^B$ represents feedstock flow rates, with a total of B streams;
$\beta_l := (\beta_{l,s})$, s∈{1, 2, 3, . . . B}, l∈Ξ is is a quality vector of feedstocks x;
y$_l$ is a quality specification for the final product;
e is an all 1 vector; and
Ξ is the set of qualities relevant for this product.

The inventors have recognized and appreciated that $\beta_l$ may be subject to uncertainty and the quality constraints may not be guaranteed with probability 1 by the selected x. However, it may be sufficient to ensure that the product is on specification with probability 1-ε, where ε<<1 and ε∈(0,1). This may yield the following chance-constrained blending-planning problem:

$$\max_{x \in X} g^T x$$

s.t.

$$Pr(\beta_l^T x \le y_l e^T x, \forall l \in \Xi) \ge 1 - \varepsilon.$$

In some embodiments, rather than solving the above formulation with a joint chance constraint, a conservative inner approximation may be made by introducing $\delta_l$, such that $$\sum_{\forall l \in \Xi} \delta_l \le \varepsilon.$$

The optimization formulation may become an individual chance-constrained problem:

$$\max_{x \in X} g^T x$$

s.t.

$$Pr(\beta_l^T x \le y_l e^T x) \ge 1 - \delta_l, \forall l \in \Xi.$$

At act 2010 of the illustrative process 2000 shown in FIG. 20, the chance-constrained programming model formulated at act 2005 may be solved to provide a blending plan. For instance, in some embodiments, if each $\beta_l$ satisfies a normal distribution N ($\varphi_l$, $\Sigma_l$), the individual chance-constrained model above may be reformulated as a second-order cone program (SOCP), which may be convex, and a global optimal solution may be derived.[22] The resulting blending plan may ensure that all quality requirements are jointly met with a probability greater than a specified threshold. In some embodiments, with normal distribution, the probabilistic constraint Pr ($\beta_l^T$x≤y$_l$e$^T$x)≥1−$\delta_l$, ∀l∈Ξ may may be equivalent to the following deterministic constraint:

[22] See, e.g., A. Ben-Tal, L. El Ghaoui, and A. Nemirovski, *Robust optimization*, Princeton University Press, Princeton, N.J., 2009.

$$\varphi_l^T x + \Phi_l^{-1}(1-\delta_l)\sqrt{x^T \Sigma_l x} \le y_l e^T x, \forall l \in \Xi.$$

where $\Phi_l$ is a cumulative distribution function of a multivariate normal distribution with mean $\varphi_l$ and covariance matrix $\Sigma_l$.

At act 2015, the blending plan obtained at act 2010 may be used to control blending of feedstocks into a final product.

Example 3 is described below for a refinery or blending terminal having 10 available feedstocks for producing a final product that is subject to various requirements. The feedstocks may include intermediates purchased and/or produced by the refinery, and/or additives. The illustrative feedstocks used in Example 3 and related data are listed in Table 17 below.

TABLE 17

Illustrative data for Example 3.

| Comp./Prod. | Density (kg/l) | RVP (psi) | RON | MON | R + M / 2 | Sulphur (ppm) | Benzene (% vol) | Price ($/bbl) | Max (kbpd) |
|---|---|---|---|---|---|---|---|---|---|
| Butane | 0.565 | 60.0 | 89.0 | 80.5 | 84.8 | 10.0 | 0.0 | 36 | 8.0 |
| LUX | 0.656 | 10.4 | 71.3 | 68.3 | 69.8 | 0.0 | 3.8 | 40 | 2.6 |
| HUX | 0.772 | 1.6 | 73.4 | 70.4 | 71.9 | 6.0 | 0.4 | 39 | 12.0 |
| Isomerate | 0.618 | 11.2 | 83.5 | 80.6 | 82.1 | 1.0 | 0.0 | 41 | 20.1 |
| Heavy Reformate | 0.855 | 2.7 | 105.2 | 92.8 | 99.0 | 0.0 | 0.0 | 52 | 15.6 |
| ARU Column Bottoms | 0.693 | 4.6 | 70.8 | 65.1 | 68.0 | 0.0 | 0.0 | 42 | 2.3 |
| Light Cracked Spirit | 0.679 | 10.6 | 93.4 | 89.7 | 91.6 | 41.0 | 0.6 | 47 | 26.3 |
| Untreated FCCS | 0.757 | 4.4 | 90.2 | 83.2 | 86.7 | 111.0 | 0.0 | 44 | 17.5 |
| Treated FCCS | 0.803 | 3.3 | 89.0 | 81.2 | 85.1 | 30.0 | 0.0 | 45 | 9.2 |
| Alkylate | 0.713 | 2.1 | 95.4 | 92.0 | 93.7 | 20.0 | 0.0 | 55 | 18.0 |
| Premium (min) | — | — | — | — | 89.5 | — | — | $54.6 | 200.0 |
| Premium (max) | 0.790 | 7.0 | — | — | — | 30.0 | 0.6 | — | — |
| Standard deviation | 0.0 | 0.8 | 1.4 | 1.8 | — | $.9\,\mu_s^{.8}$ | $.3\,\mu_b + .1$ | — | — |

Two methods for controlling blending of feedstocks are compared in Example 3. A semi-deterministic method avoids off-spec products by applying a fixed offset to quality thresholds to provide safety margins. By contrast, a chance-constrained programming method takes into account uncertainties in qualities of feedstocks and outputs a blending recipe that is optimized for profitability, while ensuring that products are within specification at a rigorously defined probability level.

In Example 3, uncertainties in five product qualities (RVP, RON, MON, sulfur, and benzene) are modeled respectively using five independent Gaussian distributions. The overall objective is to maximize profit while ensuring that blend quality will satisfy all specifications at least 95% of the time.

Figure 21:
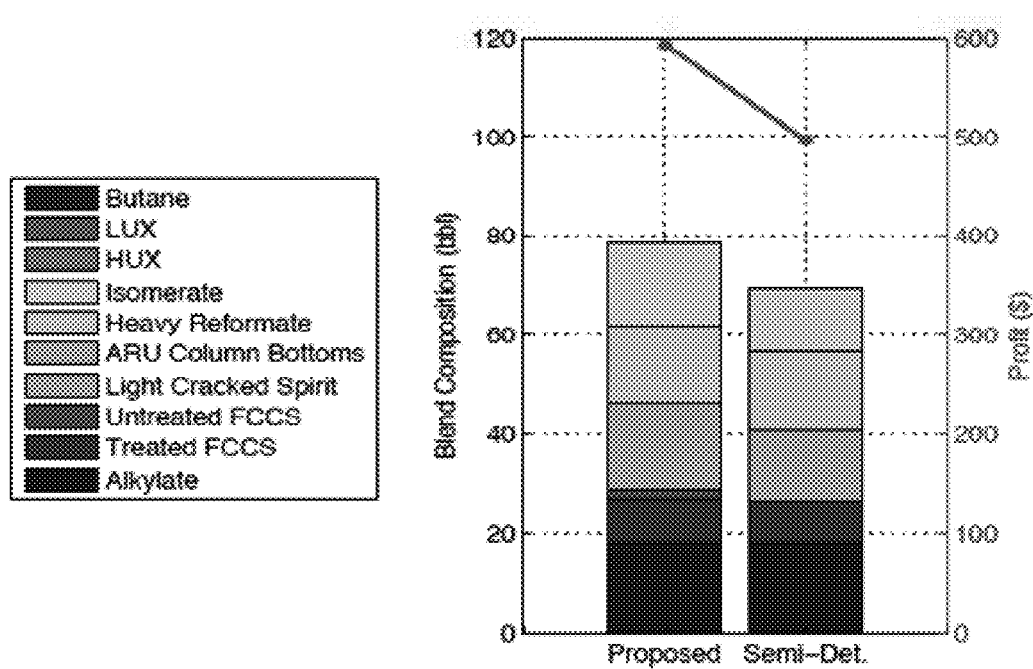
FIG. 21 shows illustrative blending recipes resulting from a chance-constrained programming method and a semi-deterministic method in Example 3.

The two optimizers corresponding, respectively, to the chance-constrained programming method and the semi-deterministic method were each run on 1000 cases in Example 3. The 1000 cases were synthesized by randomly changing prices of blendstocks. FIG. 21 shows blending recipes resulting from the chance-constrained programming method and the semi-deterministic method, respectively, in a case where a difference in profitability between the two methods has a median value. The illustrative blend percentages shown in FIG. 21 are listed in Table 18 below. The feedstock prices in the median case are shown in Table 19 below.

TABLE 18

Blend percentages for Example 3.

| | Quantity (%) | |
|---|---|---|
| Component | Proposed | Semi-Det. |
| Butane | 0.0 | 0.0 |
| LUX | 0.0 | 0.0 |
| HUX | 0.0 | 0.0 |
| Isomerate | 21.1 | 18.6 |
| Heavy Reformate | 19.8 | 22.5 |
| ARU Column Bottoms | 0.0 | 0.0 |
| Light Cracked Spirit | 21.9 | 20.4 |
| Untreated FCCS | 2.5 | 0.0 |
| Treated FCCS | 11.7 | 12.7 |
| Alkylate | 22.9 | 25.9 |
| Total (bbl) | 78.6 | 69.4 |

TABLE 19

Prices of feedstocks in median case in Example 3.

| Component | Price |
|---|---|
| Butane | 31.23 |
| LUX | 43.19 |
| HUX | 42.24 |
| Isomerate | 36.72 |
| Heavy Reformate | 48.84 |
| ARU Column Bottoms | 43.64 |
| Light Cracked Spirit | 48.07 |
| Untreated FCCS | 53.00 |
| Treated FCCS | 41.16 |
| Alkylate | 56.36 |

As shown in FIG. 21, the chance-constrained programming method outperforms the semi-deterministic method in terms of profitability by about 15% in the median case in Example 3. Table 20 shows product qualities under these two approaches. The chance-constrained programming method comes closer to the quality specification on RVP, DON, sulfur, and benzene. This may allow the refinery to produce more products with less giveaway.

TABLE 20

Product Qualities in median case in Example 3.

| Quality | Spec | Proposed | Semi-Det. |
|---|---|---|---|
| Density | <0.79 | 0.73 | 0.73 |
| RVP | <7.00 | 6.20 | 5.81 |
| DON | >89.5 | 90.64 | 91.20 |
| Sulphur | <30.0 | 19.93 | 17.13 |
| Benzene | <0.6 | 0.12 | 0.11 |

Although details of implementation are described above in connection with FIG. 20 and Example 3, it should be appreciated that aspects of the present disclosure are not limited to such details. For instance, a chance-constrained programming model may take into account other uncertainties such as feedstock costs and availabilities, product prices, market demands, etc., in addition to, or instead of, feedstock qualities.

Figure 22:
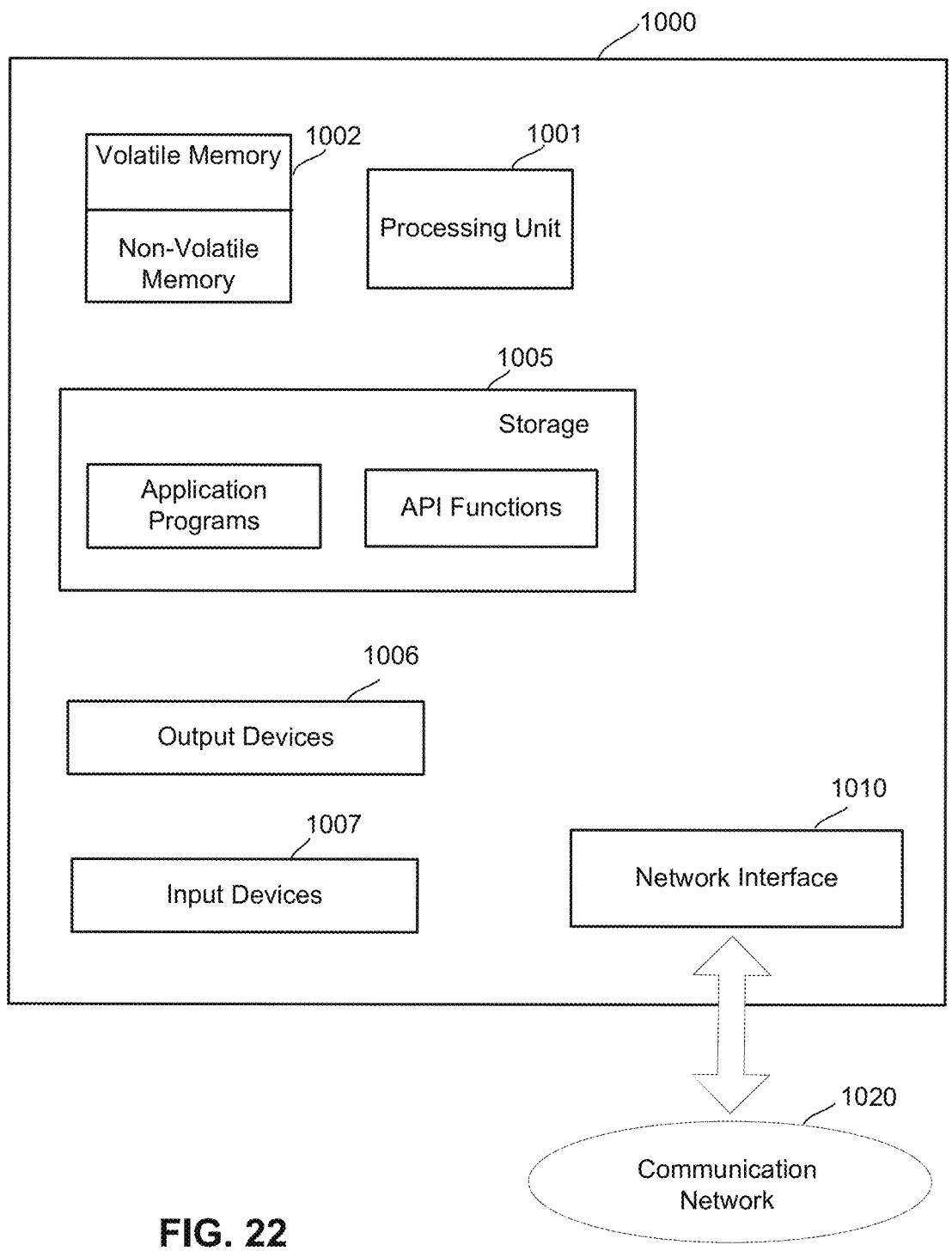
FIG. 22 shows, schematically, an illustrative computer 1000 on which any aspect of the present disclosure may be implemented.

FIG. 22 shows, schematically, an illustrative computer 1000 on which any aspect of the present disclosure may be implemented. For example, any one or more of the illustrative optimization techniques described herein may be implemented on the computer 1000.

In the embodiment shown in FIG. 22, the computer 1000 includes a processing unit 1001 having one or more processors and a non-transitory computer-readable storage medium 1002 that may include, for example, volatile and/or non-volatile memory. The memory 1002 may store one or more instructions to program the processing unit 1001 to perform any of the functions described herein. The computer 1000 may also include other types of non-transitory computer-readable medium, such as storage 1005 (e.g., one or more disk drives) in addition to the memory 1002. The storage 1005 may also store one or more application programs and/or resources used by application programs (e.g., software libraries), which may be loaded into the memory 1002.

The computer 1000 may have one or more input devices and/or output devices, such as devices 1006 and 1007 illustrated in FIG. 22. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, the input devices 1007 may include a microphone for capturing audio signals, and the output devices 1006 may include a display screen for visually rendering, and/or a speaker for audibly rendering, recognized text.

As shown in FIG. 22, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks, or fiber optic networks.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having,"

"containing," "involving," and variations thereof herein, is meant to encompass the items listed thereafter and equivalents thereof as well as additional items.

| Nomenclature: Variables | |
|---|---|
| $b_{jk}^h$ | variable equal to bilinear term $x_j^h f_k^h$ |
| $d_{C_i}$ | binary variable to indicate whether crude $C_i$ is purchased |
| f | fraction |
| q | violation of constraints |
| v | volume |
| x | flow |
| $z_{C_i}$ | procurement amount of crude $C_i$ in kT |
| $\tilde{z}_{C_i}$ | procurement amount of crude $C_i$ in discrete lots |
| $\hat{z}_{C_{it}}$ | $t^{th}$ binary variable to represent integer value $\tilde{z}_{C_i}$ |
| $\eta^h$ | sales in scenario h |

| Nomenclature: Parameters | |
|---|---|
| a | cost of refinery operations and product prices in objective function |
| β | quality vector of feedstocks x |
| H | number of scenarios |
| M | total number of constraints for each scenario |
| P | input/output fraction for each unit |
| Q | number of barrels for one lot |
| r | total number of binary variable 2 for each crude |
| RON | research octane number |
| S | sulfur percentage |
| Sen | sensitivity |
| U | calorific value |
| V | vapor pressure |
| Vis | viscosity |
| W | fuel consumption coefficient for each unit |
| λ | Lagrange multiplier of PBP |
| μ | Lagrange multiplier of FP |
| ρ | density (kT/m³) |
| ρ̂ | density (kT/bbl) |
| θ | penalty factor |
| y | quality specification for final product in blending problem |
| $\bar{z}_{C_i}$ | upper bound of crude $C_i$ purchase |
| $\underline{z}_{C_i}$ | lower bound of crude $C_i$ purchase if order is placed |

| Nomenclature: Terms | |
|---|---|
| AGO | one of operating modes of cracker |
| CGO | light cycle oil |
| CN | cat cracked gasoline |
| Cr | cracker |
| D | distillation unit |
| Des | desulfurizing unit |
| DESCGO | desulfurized light cycle oil |
| DESGO | desulfurized gas oil |
| ES95 | gasoline |
| F1 | one of formulations of jet fuel |
| F2 | one of formulations of jet fuel |
| FP | feasibility problem |
| GO | gas oil |
| HF | heavy fuel oil |
| HN | heavy naphtha |
| I | isomerization unit |
| ISO | isomerate |
| JF | jet fuel |
| KE | kerosene |
| LBP | lower bounding problem |
| LG | liquefied petroleum gas |
| LN | light naphtha |
| Mogas | one of operating modes of cracker |
| PBP | primal bounding problem |
| PG98 | gasoline |
| PP | primal problem |
| R | reformer |
| R95 | one of yields of reformer |
| R100 | one of yields of reformer |
| RMP | relaxed master problem |
| Sev95 | one of operating modes of reformer |
| Sev100 | one of operating modes of reformer |
| VGO | vacuum distillate |
| VR | vacuum residual |

What is claimed is:

1. A method for selecting one or more crude oils from a plurality of crude oils, the method comprising acts of:
generating a plurality of scenarios based at least in part on historical data relating to the quality of the crude oil, each scenario comprising a plurality of values corresponding, respectively, to a plurality of uncertain parameters, the plurality of uncertain parameters comprising at least one uncertain parameter relating to a quality of a crude oil of the plurality of crude oils;
using at least one processor programmed by executable instructions to solve a stochastic programming model to obtain a solution that optimizes an objective function, wherein:
the stochastic programming model represents one or more refinery operations performed on one or more crude oils to produce one or more final products;
the solution includes one or more crude oils to be procured and, for each crude oil to be procured, a procurement amount; and
the solution satisfies at least one constraint in each scenario of the plurality of scenarios, the constraint representing a quality specification for a final product;
procuring the one or more crude oils based on respective procurement amounts in the solution of the stochastic programming model; and
using the historical data relating to the quality of the crude oil to identify a probability distribution for the at least one uncertain parameter, wherein the plurality of scenarios are generated at least in part by sampling the probability distribution.

2. The method of claim 1, further comprising:
identifying a realized scenario based at least in part on at least one physical measurement taken from at least one procured crude oil, the realized scenario comprising a plurality of realized values corresponding, respectively, to the plurality of uncertain parameters; and
controlling, based at least in part on the realized scenario, performance of the one or more refinery operations on the one or more procured crude oils.

3. The method of claim 2, wherein controlling the performance of the one or more refinery operations comprises:
using the realized scenario to determine one or more values for one or more flow rates, the one or more values optimizing the objective function given the realized scenario; and
controlling the one or more flow rates using the one or more values determined using the realized scenario.

4. The method of claim 1, wherein the stochastic programming model comprises one or more nonconvex functions, and wherein solving the stochastic programming model comprises using a nonconvex generalized Benders decomposition (NGBD) method to solve the stochastic programming model.

5. A system for selecting one or more crude oils from a plurality of crude oils, the system comprising:

at least one processor; and at least one computer-readable medium having encoded thereon executable instructions, wherein the at least one processor is programmed by the executable instructions to:

generate a plurality of scenarios based at least in part on historical data relating to the quality of the crude oil, each scenario comprising a plurality of values corresponding, respectively, to a plurality of uncertain parameters, the plurality of uncertain parameters comprising at least one uncertain parameter relating to a quality of a crude oil of the plurality of crude oils;

solve a stochastic programming model to obtain a solution that optimizes an objective function, wherein:

the stochastic programming model represents one or more refinery operations performed on one or more crude oils to produce one or more final products;

the solution includes one or more crude oils to be procured and, for each crude oil to be procured, a procurement amount;

the solution satisfies at least one constraint in each scenario of the plurality of scenarios, the constraint representing a quality specification for a final product; and cause the one or more crude oils to be procured based on respective procurement amounts in the solution of the stochastic programming model; and use the historical data relating to the quality of the crude oil to identify a probability distribution for the at least one uncertain parameter, wherein the at least one processor is programmed to generate the plurality of scenarios at least in part by sampling the probability distribution.

6. The system of claim 5, wherein the at least one processor is further programmed to:

identify a realized scenario based at least in part on at least one physical measurement taken from at least one procured crude oil, the realized scenario comprising a plurality of realized values corresponding, respectively, to the plurality of uncertain parameters; and control, based at least in part on the realized scenario, performance of the one or more refinery operations on the one or more procured crude oils.

7. The system of claim 6, wherein the at least one processor is programmed to control the performance of the one or more refinery operations at least in part by:

using the realized scenario to determine one or more values for one or more flow rates, the one or more values optimizing the objective function given the realized scenario; and controlling the one or more flow rates using the one or more values determined using the realized scenario.

8. The system of claim 5, wherein the stochastic programming model comprises one or more nonconvex functions, and wherein the at least one processor is programmed to solve the stochastic programming model at least in part by using a nonconvex generalized Benders decomposition (NGBD) method to solve the stochastic programming model.

* * * * *